(12) United States Patent
Deng et al.

(10) Patent No.: US 9,618,398 B2
(45) Date of Patent: Apr. 11, 2017

(54) TIME-TEMPERATURE INDICATOR AND MONITORING METHOD FOR MONITORING QUALITY STATE OF THERMALLY SENSITIVE ARTICLE

(75) Inventors: Zongwu Deng, Suzhou (CN); Xiaofang Ying, Suzhou (CN); Xiaoju Shi, Suzhou (CN)

(73) Assignee: SUZHOU QUALIMARK TECHNOLOGY CO., LTD., Suzhou (CN)

( * ) Notice: Subject to any disclaimer, the term of this patent is extended or adjusted under 35 U.S.C. 154(b) by 534 days.

(21) Appl. No.: 14/127,410

(22) PCT Filed: Jun. 26, 2012

(86) PCT No.: PCT/CN2012/077568
§ 371 (c)(1),
(2), (4) Date: Dec. 18, 2013

(87) PCT Pub. No.: WO2013/000401
PCT Pub. Date: Jan. 3, 2013

(65) Prior Publication Data
US 2014/0119402 A1    May 1, 2014

(30) Foreign Application Priority Data
Jun. 29, 2011   (CN) .......................... 2011 1 0178976

(51) Int. Cl.
*G01K 3/00*     (2006.01)
*G01K 11/12*    (2006.01)
(Continued)

(52) U.S. Cl.
CPC ................ *G01K 11/12* (2013.01); *B32B 3/04* (2013.01); *B32B 7/06* (2013.01); *B32B 7/12* (2013.01);
(Continued)

(58) Field of Classification Search
None
See application file for complete search history.

(56) References Cited

U.S. PATENT DOCUMENTS 4,057,029 A     11/1977 Seiter ............................ 374/106
5,045,283 A *   9/1991 Patel ....................... G07C 1/00
                                                        116/206
(Continued)

FOREIGN PATENT DOCUMENTS

CN        201159676        12/2000
CN       2005803805         1/2005
(Continued)

OTHER PUBLICATIONS

International PCT Search Reporting issued in PCT/CN2012/077568 dated Sep. 20, 2012.
(Continued)

*Primary Examiner* — Erica Lin
(74) *Attorney, Agent, or Firm* — Norton Rose Fulbright US LLP

(57) ABSTRACT

The present invention relates to a time-temperature indicator for monitoring the quality state of a thermally sensitive article and a monitoring method. The present invention also relates to a preparation method of the time-temperature indicator and a thermally sensitive article using the time-temperature indicator. The time-temperature indicator according to the present invention comprises two laminated layers which are physically separated, i.e. a function indication layer and an adsorption function layer. The two laminated layers are stored and transported separately, and combined together in use. Therefore, the time-temperature indicator of the present invention can be stored and transported at room temperature, which reduces the usage costs of the time-temperature indicator.

20 Claims, 7 Drawing Sheets

(51) Int. Cl.
  *B65D 79/02*    (2006.01)
  *F16D 66/02*    (2006.01)
  *G01K 3/04*    (2006.01)
  *B32B 37/02*    (2006.01)
  *B32B 7/06*    (2006.01)
  *B32B 7/12*    (2006.01)
  *B32B 27/08*    (2006.01)
  *B32B 27/20*    (2006.01)
  *B32B 3/04*    (2006.01)

(52) U.S. Cl.
  CPC .............. *B32B 27/08* (2013.01); *B32B 27/20* (2013.01); *B32B 37/02* (2013.01); *B65D 79/02* (2013.01); *F16D 66/021* (2013.01); *G01K 3/04* (2013.01); *B32B 2307/4026* (2013.01); *B32B 2307/748* (2013.01); *B32B 2519/00* (2013.01); *Y10T 156/10* (2015.01)

(56) References Cited

U.S. PATENT DOCUMENTS

| | | | |
|---|---|---|---|
| 6,042,264 A | 3/2000 | Prusik et al. | 374/106 |
| 6,244,208 B1 | 6/2001 | Qiu et al. | 116/207 |
| 6,514,462 B1 | 2/2003 | Simons | 422/82.12 |
| 7,275,863 B1 * | 10/2007 | Akers | G01K 11/06 116/216 |
| 2007/0140068 A1 * | 6/2007 | Teffenhart | G04F 1/00 368/327 |

FOREIGN PATENT DOCUMENTS

| | | |
|---|---|---|
| CN | 2007849795 | 12/2007 |
| EP | 0484578 | 5/1992 |
| EP | 2151323 | 2/2010 |
| JP | 2010-171354 | 6/1998 |
| JP | 2002-513146 | 5/2002 |
| JP | 2003-065862 | 3/2003 |
| JP | 2005-505598 | 2/2005 |
| WO | WO 2006/001801 | 6/2004 |

OTHER PUBLICATIONS

Supplementary European Search Reporting issued in EP 12803738 dated Feb. 26, 2015.

\* cited by examiner (a) Start  (b) Intermediate Point  (c) End  (d) Point after the end

TIME-TEMPERATURE INDICATOR AND MONITORING METHOD FOR MONITORING QUALITY STATE OF THERMALLY SENSITIVE ARTICLE

CROSS-REFERENCE TO RELATED APPLICATIONS

This application is a national phase application under 35 U.S.C. §371 of International Application No. PCT/CN2012/077568 filed Jun. 26, 2012, which claims the priority of Chinese Patent Application No. 201110178976.4, filed Jun. 29, 2011. The entire content of the above-referenced applications are incorporated into the present application by reference.

TECHNICAL FIELD

The present invention relates to a time-temperature indicator for monitoring the quality state of a thermally sensitive article and a monitoring method for monitoring the quality state of a thermally sensitive article. In particular, the present invention relates to the preparation of a time-temperature indicator using a volatile dye. The time-temperature indicator, by means of the colour change resulted by the volatilization of the volatile dye, indicate whether a thermally sensitive article deteriorates or fails due to the influence of temperature or exposure to a temperature for too long time.

BACKGROUND ART

Some articles which are very sensitive to the temperature, such as most of vaccines, biological products, bioactive samples, some medicines and the like as well as fresh foods such as fresh milk, milk product, fresh meat, fresh fish and the like, need to be stored and transported at low temperature. For a long time, it is a main method for ensuring the safety of these articles/products, especially medicines or foods, to label the valid period, the quality guarantee period or the fresh preservation period. However, these methods can seldom suggest that whether those medicines or foods which need to be stored and transported at low temperature have been exposed to a temperature exceeding the safe storage and transport temperature for a too long time. The use safety and the use of various thermally sensitive articles can be better ensured by using a simple and inexpensive method to accurately indicate whether the thermally sensitive articles, such as fresh food, vaccines (usually between 2° C. and 8° C.), bioactive samples and the like which need low temperature storage, deteriorate, fail or lose activity during the storage or transport because the safe storage and transport temperature is exceeded.

In 1990s, the World Health Organization (WHO) began to pay attention to the problem that vaccines are overheated during the cold chain storage and transport, because this will lead to a decrease in the immune effect of the vaccines, reducing the protection of vaccines for children. Subsequently, the WHO called for the development of a tag which is easy to use and inexpensive so as to accurately reflect the thermal history of vaccines from leaving the factory after manufacture, being transported and stored, to reaching end users. The essential requirements for the tag are as follows: 1. it may give accurate indication to restrict the use of vaccines overheated; 2. it has a small volume, and may be sticked onto a vaccine bottle, an ampoule or an injector; 3. it is stable and reliable during the whole process from production to actual use; 4. it is suitable for mass production, is inexpensive and meets the global demand for vaccines of United Nations International Children's Emergency Fund.

In 1996, the TempTime company (the predecessor of which is Lifelines), USA developed a tag for the first time which can meet the requirements of WHO, and the tag is applied to the polio vaccines produced by three vaccine manufacturers, i.e., GlaxoSmithKline, Sanofi-Pasteur and Novartis. The tags provided by Temptime are classified into three categories according to the function thereof. The first one is Critical Temperature Indicator (CTI), which immediately changes colour once the set value of temperature is exceeded. The second one is Critical Temperature-Time Indicator (CTTI), the colour change of which delays to some extent, and which changes colour after exposing to a temperature above the set value for several minutes or tens of minutes. The third one is known as Time-Temperature Indicator (TTI), having a longer response time, in which the temperature sensing material changes colour after receiving certain amount of heat, and this kind of tag is a tag suitable for indicating the thermal history of vaccines.

Currently, there are hundreds of patents related to Time-Temperature Indicators in the world. These patented technologies can be classified into mechanical type, chemical type, enzyme reaction type, microorganism type, polymer type, electronic chemical type, diffusion type and the like according to the operating principles of the products. These technologies are mainly based on mechanical property, electrical property, diffusion property, bio-enzyme reaction, polymerization and the like of the materials. There are mainly three kinds of TTI tags which are more mature and already commercialized: polymer type, enzyme reaction type and diffusion type.

The polymer type is developed by TempTime company, USA, and mainly based on that a coloured polymer is produced by the solid state 1,4-addition polymerization of a substituted diacetylene derivative. The rate of this polymerization increases as the temperature rises, and the produced polymer makes the colour darker continuously. By comparison with the colour of surroundings, it is indicated whether the vaccines have been overheated. It is required to screen and synthesize suitable monomer for such a tag, and the tag need to be stored at −18° C. or below after its production, which obviously increases the use cost of the tag.

Early indicator of enzyme reaction type is essentially a kind of pH indicator, which indicates the temperature history or heating history by measuring the colour change caused by the pH value change of the medium which is caused by the protons $H^+$ released from the enzyme-catalyzed hydrolysis of lipids substrate. The enzymatic hydrolysis becomes faster as the temperature rises, and thus the release rate of protons also becomes faster. A typical one is Vitsab ring indicator developed by a Swedish company.

A typical product of earlier diffusion type time-temperature indicator is 3M Monitor Mark indicator produced by 3M company, USA, which is based on the diffusion of the dye on a string, and the temperature indicating range and response time of which depends on the type of dyes. Another form of diffusion type indicator is prepared by coating a porous substrate with a material having specific melting point. The optical refractive indexes of the substrate and the material are close to each other. When the material melts at a temperature above specific temperature and diffuses into the porous substrate, the transmittance of the substrate increases after the air in the pores of the substrate is exhausted, and thus a colour change is achieved, showing the heating process.

Currently, WHO classifies nearly twenty vaccines into 4 categories according to their stability: the most unstable vaccines, unstable vaccines, stable vaccines and highly stable vaccines, and thus proposes the technical requirements for corresponding time-temperature indicators. The technical standards thus established takes the properties of indicator products in the prior art into account, but do not depend on the thermal stability of vaccines per se completely. In fact, among twenty vaccines which need cold chain storage and transport and to be monitored during the whole process, each vaccine has different stability. An ideal time-temperature indicator should be an individualized time-temperature indicator adequately reflecting the thermal stability of the product indicated, i.e. the rate of colour change and the temperature effect thereof keep as consistent as possible with the failure process of the product.

Therefore, in the art there is still a need for a time-temperature indicator and method for monitoring the thermal history of thermally sensitive articles, which are used for monitoring the storage and transport of thermally sensitive articles, and for accurately indicating whether a thermally sensitive article has failed or deteriorated.

SUMMARY OF INVENTION

One object of the present invention is to provide a time-temperature indicator for monitoring the quality state of a thermally sensitive article, which is used for monitoring the thermal history of a thermally sensitive article and indicating whether the thermally sensitive article has failed or deteriorated.

Another object of the present invention is to provide a method for preparing a time-temperature indicator for monitoring the quality state of a thermally sensitive article.

Yet another object of the present invention is to provide a method for monitoring the quality state of a thermally sensitive article.

The inventor discovers that a laminated structure is formed as follows: attaching volatile species having some colour (referred as volatile dye herein) onto a thermally sensitive article, on the volatile dye attaching a layer of adsorption material which can absorb the dye, and sealing the volatile dye layer and the adsorption material layer on the thermally sensitive article with a sealing layer; during the storage and transport, the volatile dye absorbs heat and volatilizes, and then it is absorbed by the adsorption material layer; the colour of the volatile dye layer becomes lighter due to the heat absorption volatilization, and the volatilization amount of the dye is closely related to its thermal history. On one hand, the volatilization amount of the dye increases as the time extends at a temperature. On the other hand, the volatilization rate increases as the temperature increases. The quality change process of a thermally sensitive article has similar characteristics, i.e. the quality of a thermally sensitive article deteriorates as the time extends at a temperature, and the failure or deterioration of a thermally sensitive article occurs after extending for a period of time; as the temperature rises, the quality deterioration rate of a thermally sensitive article increases, and the time to fail or deteriorate is shorten. For a specific thermally sensitive article, the type and amount of the dye can be selected, and/or other methods can be combined to adjust the volatilization rate of the dye, so that the colour change response of the dye layer to the thermal history is close or identical to the quality change response of the thermal sensitive article to the thermal history. Therefore, it can be easily determined whether a thermally sensitive article is in the valid period or shelf life, i.e. whether a thermally sensitive article fails or deteriorates, simply through the colour change of the dye layer. Based on the above discovery, the present invention is achieved.

Therefore, the first aspect of the present invention provides a time-temperature indicator for monitoring the quality state of a thermally sensitive article, comprising two laminated portions, i.e., an indication function layer and an adsorption function layer, which are physically independent of each other before use, wherein:

the indication function layer comprises:

a first substrate material layer;

a volatile dye layer coated on one side of the first substrate material layer, wherein the difference between the activation energy of the volatilization process of the volatile dye layer and that of the quality change process of the thermally sensitive article is in a predetermined range; and a first release film layer, which covers the volatile dye layer, wherein the first substrate material layer and the first release film layer are larger than the volatile dye layer in dimension, and the volatile dye layer is sealed between the first substrate material layer and the first release film layer;

the adsorption function layer comprises:

a second substrate material layer;

an adsorption material layer coated on one side of the second substrate material layer, wherein the adsorption material layer is larger than the volatile dye layer in dimension;

an adhesive layer, which is coated on the second substrate material layer and surrounds the periphery of the adsorption material layer; and a second release film layer, which covers the adhesive layer and the adsorption material layer.

According to the first aspect of the present invention, when it is used, the time-temperature indicator in the state of use is formed as follows: removing the first release film layer and the second release film layer, aligning the adsorption material layer with the volatile dye layer, and sealing the volatile dye layer and the adsorption material layer between the first substrate layer and the second substrate layer, and tightly attaching the time-temperature indicator on the thermally sensitive article.

The second aspect of the present invention provides a thermally sensitive article using the time-temperature indicator according to the first aspect of the present invention.

The third aspect of the present invention provides a preparation method of a time-temperature indicator for monitoring the quality state of a thermally sensitive article, comprising the following steps:

providing a first substrate material;

coating one side of the first substrate material with a volatile dye layer to form a volatile dye layer, wherein the difference between the activation energy of the volatilization process of the volatile dye layer and that of the quality change process of the thermally sensitive article is in a predetermined range;

covering the volatile dye layer with a first release film layer to form an indication function layer;

and providing a second substrate material;

coating one side of the second substrate material with an adsorption material to form an adsorption material layer;

wherein the adsorption material layer is larger than the volatile dye layer in dimension;

coating the periphery of the adsorption material layer on the second substrate material layer with an adhesive layer; and covering the adhesive layer and the adsorption material layer with a second release film layer, and sealing the adsorption material layer between the substrate material layer and the second release film layer to form an adsorption function layer.

The fourth aspect of the present invention provides a method for monitoring the quality state of a thermally sensitive article, comprising the following steps:

providing a thermally sensitive article, wherein the duration that the thermally sensitive article remains in effective quality state at temperature T1 is t1;

on one or more areas of the thermally sensitive article attaching:

a volatile dye layer, which has an end colour difference C1 after time t1 at temperature T1;

an adsorption material layer, which irreversibly adsorbs the dye volatilized from the volatile dye layer;

a sealing film layer, which is larger than the adsorption material layer and the volatile dye layer in dimension, and hermetically attaches the adsorption material layer and the volatile dye layer onto the thermally sensitive article;

practically treating the thermally sensitive article after attaching the sealing film;

observing or determining the actual colour difference C2 of the volatile dye layer after being treated practically;

comparing the actual colour difference C2 with the end colour difference C1 of the volatile dye layer, wherein if the actual colour difference C2 of the volatile dye layer is larger than the end colour difference C1, it is indicated that the thermally sensitive article remains in effective quality state; if the actual colour difference C2 of the volatile dye layer is less than the end colour difference C1, it is indicated that the thermally sensitive article fails.

According to the method of the fourth aspect of the present invention, the sequence of attaching the volatile dye layer and the adsorption material layer is not limited, i.e. the volatile dye layer may be attached first, and then the adsorption material layer; also the adsorption material layer may be attached first, and then the volatile dye layer.

Figure 1:
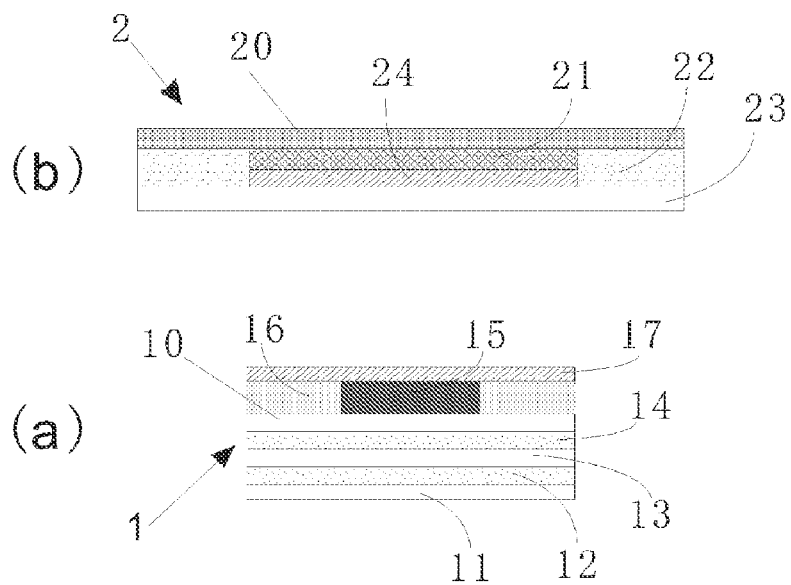
FIG. 1 is a structure diagram of a time-temperature indicator prepared according to one example of the present invention.

The terms and the reference numbers thereof used in the present invention are summarized as follows:

| | |
|---|---|
| indication function layer 1, | volatile dye layer 15, |
| adsorption function layer 2, | reference colour layer 16, |
| thermally sensitive article 3, | first release film layer 17, |
| substrate material layer 10, | substrate material layer 20, |
| second release film layer 23, | adsorption material layer 21, |
| adhesive layer 12, | adhesive layer 22, |
| sealing film layer 13, | release film layer 23, |
| sealing adhesive layer 14, | isolation layer 24. |

DESCRIPTION OF EMBODIMENTS

The first aspect of the present invention provides a time-temperature indicator for monitoring the quality state of a thermally sensitive article.

In one embodiment, the time-temperature indicator of the present invention comprises two laminated portions, i.e., an indication function layer and an adsorption function layer, which are physically independent of each other before use, in which;

the indication function layer comprises:

a first substrate material layer;

a volatile dye layer, which is coated on one or more areas on one side of the first substrate material layer; and a first release film layer, which is coated on the volatile dye layer, wherein the first substrate material layer and the first release film layer are larger than the volatile dye layer in dimension, and the volatile dye layer is sealed between the first substrate material layer and the first release film layer;

wherein the difference between the activation energy of the volatilization process of the volatile dye layer and that of the quality change process of the thermally sensitive article is in a predetermined range;

the adsorption function layer comprises:

a second substrate material layer;

an adsorption material layer, which is coated on one side of the second substrate material layer, wherein the adsorption material layer is larger than the volatile dye layer in dimension;

an adhesive layer, which is coated on the second substrate material layer, and surrounds at the periphery of the adsorption material layer; and a second release film layer, which covers the adhesive layer and the adsorption material layer.

In use, a time-temperature indicator in the state of use is formed as follows: removing the first release film layer and the second release film layer, aligning the adsorption material layer with the volatile dye layer, and sealing the volatile dye layer and the adsorption material layer between the first substrate layer and the second substrate layer.

The first substrate layer of this time-temperature indicator is tightly pasted on the thermally sensitive article. Before using the thermally sensitive article, the adsorption material layer is separated from the volatile dye layer, and then the colour of the volatile dye layer is observed or measured.

Preferably, after the time-temperature indicator of the present invention is previously subjected to the treatment same as the process in which the thermally sensitive article loses efficacy or deteriorates, the colour difference of the volatile dye layer is measured with a colorimeter, and this colour difference value is defined as the end colour difference. Before the thermally sensitive article with the time-temperature indicator of the present invention is to be used, the actual colour difference of the volatile dye layer is measured. If the actual colour difference of its volatile dye layer is larger than the end colour difference, it is indicated that this thermally sensitive article has not failed or deteriorated and it is in a usable state. If the actual colour difference of its volatile dye layer is less than or equal to the end colour difference, it is indicated that this thermally sensitive article has already failed or deteriorated. Wherein, the colorimeter may be any commercially available colorimeter.

Preferably, after the end colour difference is measured, a reference colour tag with this end colour difference is prepared with a non-volatile dye or pigment. Before the thermally sensitive article with the time-temperature indicator of the present invention is to be used, the colour of the volatile dye layer is visually observed, and compared with the reference colour tag. If the colour of the volatile dye layer is darker than that of the reference colour tag, it is indicated that this thermally sensitive article has not failed or deteriorated and it is in a usable state. If the colour of the volatile dye layer is lighter than or the same as that of the reference colour tag, it is indicated that this thermally sensitive article has already failed or deteriorated and it is not usable.

For example, if a thermally sensitive article will deteriorate or fail after time t1 at temperature T1, then the time-temperature indicator of the present invention may be subjected to a treatment for the time t1 at temperature T1, and the colour difference of the volatile dye layer after the treatment is recorded as the end colour difference. If the time t1 is too long, the end colour difference may also be measured with accelerating test known to those skilled in the art.

The reference colour tag may be separated from the indication function layer and the adsorption function layer, or combined in the indication function layer. Preferably, the reference colour tag is arranged adjacent to the volatile dye layer. Here, any feasible arrangement may be used, for example the reference colour tag is arranged abreast with the volatile dye layer, or arranged around the volatile dye layer, or the like. More preferably, after coating the volatile dye layer, a reference colour layer is coated near or around it, and this reference colour layer acts as the reference colour tag. More preferably, after coating the volatile dye layer and coating a reference colour layer near or around it, the volatile dye layer and the reference colour layer are sealed between the first substrate layer and the first release film layer. Before the thermally sensitive article is to be used, the colour of the volatile dye layer is visually compared with that of the reference colour tag (i.e. reference colour layer), and it is thus determined whether the thermally sensitive article fails or deteriorates.

More preferably, the first substrate material layer per se is prepared as the reference colour tag.

The thermally sensitive article is selected from vaccines, biological articles, bioactive samples, medicines, food or drinks. Preferably, the thermally sensitive article is an article which needs to be stored and/or transported at a temperature in the range from −40° C. to 50° C., preferably from −30° C. to 40° C., preferably from −30° C. to 30° C., preferably from −20° C. to 20° C., preferably from −20° C. to 10° C., preferably from −10° C. to 10° C., preferably from 0° C. to 10° C., such as from 2° C. to 8° C. For example, it may be any article which needs to be stored and/or transported at a temperature in the range from 2° C. to 8° C. recorded in volumes one, two and three of "Chinese Pharmacopoeia", edition 2005 or 2010. The thermally sensitive article includes but is not limited to: vaccines, such as thermally instable vaccines, such as polio vaccine, typhoid vaccine, hepatitis B vaccine and the like; biological articles, such as human immunoglobulin, anti-human T lymphocyte porcine immunoglobulin, and the like; bioactive samples, such as plasma, whole blood, serum and the like; medicines, such as posterior pituitary injection, etifenin and stannous chloride for Injection and the like; food, such as fresh meat, fresh fish and the like; drinks, such as fresh milk, diary, yoghurt, pasteurized milk and the like.

In the present invention, the difference between the activation energy of the volatilization process of the volatile dye layer and the activation energy of the quality change or failure process of the thermally sensitive article is in a predetermined range, and preferably the difference is in a range of ±10 kJ/mol, more preferably ±5 kJ/mol. Preferably, the activation energy of the volatilization process of the volatile dye layer is 60-140 kJ/mol. The activation energy of the volatilization process of the volatile dye layer described in the present invention refers to the apparent activation energy of the time-temperature indicator of the present invention in use during the volatilization process of the volatile dye layer.

Preferably, the volatile dye layer is in solid or liquid state at a temperature in the range of 0-80° C., more preferably in solid state at a temperature in the range of 0-50° C.

In the present invention, the volatile dye is not particularly limited, and any volatile dye which can achieve the object of the present invention may be used. Preferably, the volatile dye is at least one selected from azo dyes, anthraquinone dyes, compounds of formula I and the derivatives thereof, or the combination thereof, wherein the compounds of formula I have the following formula:

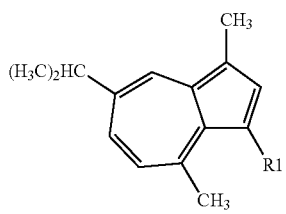

wherein,

R1 is selected from the group consisting of hydrogen, halogen, $C_{1-6}$ linear or branched alkyl, such as methyl, ethyl, n-propyl, isopropyl, n-butyl, sec-butyl, tert-butyl, n-pentyl, isopentyl, neopentyl, n-hexyl and the like; $C_{1-6}$ linear or branched alkoxy, such as methoxy, ethoxy, propoxy, isopropoxy, butoxy, sec-butoxy, tert-butoxy, pentyloxy, isopentyloxy, neopentyloxy, hexyloxy and the like; —COR2, —COOR2;

R2 is selected from the group consisting of hydrogen, $C_{1-6}$ linear or branched alkyl, such as methyl, ethyl, n-propyl, isopropyl, n-butyl, sec-butyl, tert-butyl, n-pentyl, isopentyl, neopentyl, n-hexyl and the like; $C_{1-6}$ linear or branched alkylamino, such as methylamino, ethylamino, propylamino, isopropylamino, butylamino, sec-butylamino, tert-butylamino, pentylamino, isopentylamino, neopentylamino, hexylamino and the like.

More preferably, the volatile dye is selected from the compound of formula I.

Preferably, the volatile dye layer also contains one or more volatilization additives. In the present invention, the volatilization additive is not particularly limited, and any volatilization additive which can achieve the object of the present invention may be used, as long as it may adjust the volatilization rate of the volatile dye of the present invention. The volatilization additive herein may accelerate or slow down the volatilization of the volatile dye. Preferably, the volatilization additive is one or more selected from the following volatile compounds:

linear alkanes, branched alkanes, cycloalkanes or aromatic hydrocarbons, such as hexane, heptane, octane or the isomer thereof, cyclohexane, cycloheptane, cyclopentane, naphthalene, anthracene and the like;

linear or branched or aromatic or cyclic alcohols, such as butantetraol, lauryl alcohol, tridecanol, tetradecanol, pentadecanol, hexadecanol, stearyl alcohol and the like;

linear or branched or aromatic or cyclic carboxylic acids, such as maleic acid, fumaric acid, lauric acid, tridecanoic acid, myristic acid, pentadecanoic acid, palmitic acid, adipic acid, sebacic acid, dodecanedioic acid and the like;

amino acids, such as aminobenzoic acid, leucine, phenylalanine and the like;

esters;

sulfones, such as diphenyl sulfone, diphenyl disulfone, dibenzyl sulfone, dibutyl sulfone and the like;

and various volatile natural materials, including naphthalene, camphor and the like;

Preferably, the volatile dye layer also contains one or more solvents. In the present invention, the solvent is not particularly limited, and any solvent which can achieve the object of the present invention may be used. Preferably, the solvent is one or more selected from the group consisting of water, hexane, cyclohexane, tetrahydrofuran, benzene, dimethylbenzene, methanol, ethanol, isopropyl alcohol, 2-butanol, acetone, diethyl ether, methyl acetate, ethyl acetate, carbon tetrachloride, chloroform, dichloromethane and dichloroethane.

In the present invention, the kind of the adsorption material is not particularly limited, and any adsorption material which can achieve the object of the present invention may be used. Preferably, the adsorption material of the present invention irreversibly adsorbs the dye volatilized from the volatile dye layer, and more preferably, the rate of the adsorption in which the adsorption material adsorbs the volatile dye volatilized from the volatile dye layer is much higher than the volatilization rate of the volatile dye. When the rate of the adsorption in which the adsorption material adsorbs the volatile dye volatilized from the volatile dye layer is much higher than the volatilization rate of the volatile dye, the adsorption rate of the volatile dye is substantially merely related to the volatilization rate. Therefore, the volatilization rate of the dye is only influenced by the temperature, but not by for example the factor that it is blocked by the saturated vapour and/or almost saturated vapour produced by its volatilization, and the like. As the volatilization amount of the dye is only influenced by the temperature and the time, the colour change due to the volatilization can reflect the thermal history of the time-temperature indicator more accurately, so as to monitor the thermal history of a thermally sensitive article more accurately. Certainly, if it is required that the adsorption material layer limits the volatilization of the volatile dye layer to reduce the volatilization rate thereof, the adsorption material with relatively low adsorption rate may also be used. In one embodiment, the adsorption material includes, but is not limited to oily or aqueous adhesive, commercial adhesive paper, adhesive tape and the like.

In the present invention, the materials of the first substrate material layer and the second substrate material layer are not particularly limited, and any substrate material which can achieve the object of the present invention may be used. The same material or different materials may be used for the first substrate material layer and the second substrate material layer. Preferably, the first substrate material layer together with the first release film layer seals the volatile dye layer; the substrate material layer together with the second release film layer seals the adsorption material layer. Preferably, the first substrate material layer has a laminated structure, and a sealing adhesive layer, an adhesive layer and a third release film layer are comprised in sequence on the face opposite to the volatile dye layer on the substrate material layer. In use, the third release film layer is peeled off at first, and the adhesive layer of the first substrate material layer is pasted on the thermally sensitive layer. Then the first release film layer and the second release film layer are peeled off, the adsorption material layer is aligned with the volatile dye layer, and the adsorption material layer and the volatile dye layer are sealed together on the thermally sensitive article.

Preferably, the time-temperature indicator further comprises an isolation layer, and in use this isolation layer is located between the volatile dye layer and the adsorption material layer. Before use, this isolation layer is located between the volatile dye layer and the first release film layer or between the adsorption material layer and the second release film layer. This isolation layer may be used for adjusting the volatilization rate of the volatile dye of the volatile dye layer. This isolation layer may be beneficial to separate the volatile dye layer and the adsorption material layer. In the present invention, the material of the isolation layer is not particularly limited, and any material may be used as long as it may achieve the object of the present invention. Non-limiting examples include non-woven fabric, nylon P6 net, nylon P66 net and the like. When observing or determining the colour or colour difference of the volatile dye layer, this isolation layer together with the adsorption material layer is separated from the volatile dye layer.

The release film layer of the present invention is not particularly limited, and any release film layer which can achieve the object of the present invention may be used. It can be understood that the release film layer of the present invention may be readily selected by those skilled in the art according to the description of the present invention. In the present invention, the first, second and third release film layer have no effect of adsorbing the volatile dye. The material used in the release film layer may be widely selected, and non-limiting examples include paper, wax paper, and polymer film, such as polyethylene, polyvinyl chloride, polypropylene, polystyrene, polyethylene glycol terephthalate and the like.

Not limited to any theory, the inventor of the present invention believes that the change rate of the deterioration or failure process of the thermally sensitive article follows the Arrhenius equation, i.e.

$$\log k = -\frac{E}{2.303\ RT} + \log A,$$

wherein, k is the change rate of the deterioration or failure process of the thermally sensitive article, T is the absolute temperature (K), E is the activation energy of the process in which the thermally sensitive article deteriorates or fails, R is the ideal gas constant, and A is a constant.

Similarly, not limited to any theory, the inventor of the present invention deems that the volatilization rate of the volatile dye layer according to the present invention follows the Arrhenius equation, i.e.

$$\log k = -\frac{E}{2.303\ RT} + \log A.$$

The volatilization rate of the volatile dye layer according to the present invention may be adjusted to a rate close to the change rate of the deterioration or failure process of the thermally sensitive article by selecting the kind of the volatile dye and the amount thereof or adding a volatilization additive. Thus the thermal history of the deterioration or failure process of the thermally sensitive article is accurately indicated by means of the colour fading rate of the volatile dye. The colour fading rate has positive correlation with the volatilization rate thereof, so the colour fading rate has positive correlation with the change rate of the deterioration or failure process of the thermally sensitive article.

In another embodiment, the first substrate layer has one or more transparent areas. When the time-temperature indicator is to be used, a time-temperature indicator in the state of use is formed as follows: removing the first release film layer and the second release film layer, aligning the adsorption material layer with the volatile dye layer, and sealing the volatile dye layer and the adsorption material layer between the first substrate layer and the second substrate layer. The second substrate layer is pasted on the thermally sensitive article. Before using the thermally sensitive article, the colour depth or colour difference of the volatile dye layer is observed or measured directly through a transparent area. Preferably, the first substrate layer per se is transparent, and when using the time-temperature indicator, the second substrate layer is pasted on the thermally sensitive article. Before using the thermally sensitive article, the colour change of the volatile dye layer is observed or measured through the transparent first substrate layer. Actually, as the colour of the volatile dye layer may be directly observed, the thermally sensitive article may be selected at any time to remove the thermally sensitive article which has failed or deteriorated, reducing unnecessary storage and transport. As the thermally sensitive article is mostly stored and transported at a low temperature, it may obviously reduce the costs of the storage and transport to reduce unnecessary storage and transport. In another aspect, the user may select to use the thermally sensitive article with lighter colour which has not deteriorated or failed, so as to reduce the deterioration or failure possibility of the thermally sensitive article.

In the present invention, the materials of the first substrate material layer and the second substrate material layer are not particularly limited, and any substrate material which can achieve the object of the present invention may be used. The same material or different materials may be used for the first substrate material layer and the second substrate material layer. Preferably, the first substrate material layer together with the first release film layer seals the volatile dye layer; the substrate material layer together with the second release film layer seals the adsorption material layer. Preferably, the second substrate material layer has a laminated structure, and a sealing adhesive layer, an adhesive layer and a fourth release film layer are comprised in sequence on the face opposite to the volatile dye layer on the substrate material layer. In use, the fourth release film layer is peeled off at first, and the adhesive layer of the second substrate material layer is pasted on the thermally sensitive layer. Then the first release film layer and the second release film layer are peeled off, the adsorption material layer is aligned with the volatile dye layer, and the adsorption material layer and the volatile dye layer are sealed together on the thermally sensitive article.

As other features and the description and variation thereof in this embodiment are the same as or similar with those in the previous embodiment, they are not repeated here. For example, the volatile dye layer, the descriptions of the adsorption material layer, the isolation layer, the first release film layer, the second release film layer and the reference colour tag in this embodiment are the same as or similar with those in the previous embodiment; in this embodiment, the colour difference or colour depth of the volatile dye layer is observed or measured in the same manner as or similar with that of the previous embodiment; in this embodiment, the manner to determine whether the thermally sensitive article fails or deteriorates is the same as or similar with that of the previous embodiment. All the same or similar portions are not repeated here.

It may reduce the costs and increase the accuracy of monitoring the thermal history of the thermally sensitive article to use the time-temperature indicator provided by the first aspect of the present invention. Customized time-temperature indicator may be developed for various thermally sensitive articles by selecting suitable volatile dye, volatilization additive, solvent and the amount thereof. In particular, for a specific thermally sensitive article, the activation energy of the deterioration or failure process thereof and each parameter in the Arrhenius equation may be determined through an experiment. Then each parameter of the volatile dye layer in the Arrhenius equation is adjusted to that close to or same as that of the specific thermally sensitive article by selecting suitable volatile dye, volatilization additive, solvent, and the amount thereof, then a time-temperature indicator which accurately monitors the thermal history of this specific thermally sensitive article can be obtained, which can not be achieved in the prior art.

The time-temperature indicator provided by the first aspect of the present invention directly determine whether the thermally sensitive article fails or deteriorates by means of the colour change of the volatile dye layer, which is simple and easy to apply. Most time-temperature indicator in the prior art can only be stored at low temperature. The time-temperature indicator of the present invention skillfully adopts the structure that the indication function layer and the adsorption function layer are separately stored and combined in use, so the time-temperature indicator of the present invention can be stored at normal temperature, reducing the use costs of the indicator.

The time-temperature indicator provided by the first aspect of the present invention is achieved by using a new indicator colour change theory. Different from the indicators of polymer type, enzymatic reaction type and diffusion type, the present invention achieves the colour change by using the volatilization property of the material through a volatilization-adsorption dye transfer process. After adopting the new theory, inexpensive materials may be selected and used, while the range of selection is greatly widened, and the comprehensive cost for preparing the indicator is reduced.

When the first substrate material layer has one or more transparent areas or the first material layer per se is transparent, the colour of the volatile dye layer can be directly observed through the first substrate material layer. Thus the user can select and use the thermally sensitive article according to the colour of the volatile dye layer, and screen the thermally sensitive article which has deteriorated or failed during storage and transport, so that the use efficiency is obviously increased and the storage and transport costs are reduced.

In use, the time-temperature indicator according to the present invention is attached on the package container of the thermally sensitive article, and certainly may be attached on the thermally sensitive article in any convenient manner. The attachment described here may be in any feasible manner, such as pasting. For example, the time-temperature indicator may be pasted for example on the outer surface of the primary package (or the minimum package, such as an ampoule of vaccine) of vaccines, medicines and the like, such as the outer surface of a glass bottle of vaccine or medicine which is packaged with a glass bottle, or the outer surface of a soft bag of plasma or milk which is packaged with a soft bag.

The second aspect of the present invention provides a thermally sensitive article using the temperature indicator according to the first aspect of the present invention. The thermally sensitive article is as described in the first aspect of the present invention.

The third aspect of the present invention provides a preparation method of a time-temperature indicator for monitoring the quality state of a thermally sensitive article.

In one embodiment, the method of the third aspect of the present invention comprises the following steps:

providing a first substrate material layer;

coating one or more areas on one side of the first substrate material layer with a volatile dye layer to form a volatile dye layer, wherein the difference between the activation energy of the volatilization process of the volatile dye layer and that of the quality change or failure process of the thermally sensitive article is in a predetermined range;

covering the volatile dye layer with a first release film, wherein the first release film layer together with the first substrate material layer seals the volatile dye layer therebetween, to form an indication function layer; and providing a second substrate material layer;

coating one side of the second substrate material layer with an adsorption material to form an adsorption material layer; wherein the adsorption material layer is larger than the volatile dye layer in dimension;

coating an adhesive layer around the adsorption material layer on the second substrate material layer; and covering the adhesive layer and the adsorption material layer with a second release film layer, and sealing the adsorption material layer between the second substrate material layer and the second release film layer to form an adsorption function layer;

In use, a time-temperature indicator is formed as follows: peeling off the first release film and the second release film, aligning the adsorption function layer with the volatile dye layer, pasting the first substrate material layer tightly pasted on the thermally sensitive article, and sealing the volatile dye layer together with the adsorption material layer between the first substrate material layer and the second substrate material layer.

Separate indication function layer and adsorption function layer are obtained through the above preparation method. Therefore, the indication function layer and the adsorption function layer of the time-temperature indicator of the present invention may be stored and transported at normal temperature, which is hard to achieve in the time-temperature indicator of the prior art. In use, they are combined to form the time-temperature indicator of the present invention, pasted on the thermally sensitive article, and subjected to the storage and transport together with the thermally sensitive article. The time-temperature indicator can accurately monitor the thermal history of the thermally sensitive article, and accurately determine the quality state of the thermally sensitive article.

Preferably, after the time-temperature indicator of the present invention is previously subjected to the process same as the process in which the thermally sensitive article loses efficacy or deteriorates, the colour difference when the thermally sensitive article fails or deteriorates is measured with a colorimeter, and recorded as the end colour difference. Before the thermally sensitive article is to be used, the adsorption material layer is separated from the volatile dye layer, the actual colour difference of the volatile dye layer is measured with a colorimeter, and the actual colour difference is compared with the end colour difference. If the actual colour difference is larger than the end colour difference, the thermally sensitive article has not failed or deteriorated, and is in a usable quality state. If the actual colour difference is less than the end colour difference, the thermally sensitive article has failed or deteriorated, and is in an unusable quality state.

Preferably, after the time-temperature indicator of the present invention is previously subjected to the process same as the process in which the thermally sensitive article loses efficacy or deteriorates, the colour difference when the thermally sensitive article fails or deteriorates is measured, and recorded as the end colour difference. A reference colour tag having the end colour difference is prepared with a non-volatile dye or a non-volatile pigment. Before the thermally sensitive article is to be used, the adsorption material layer is separated from the volatile dye layer, the actual colour of the volatile dye layer is visually observed, and the actual colour is compared with the reference colour tag. If the actual colour is darker than the reference colour tag, the thermally sensitive article has not failed or deteriorated, and is in a usable quality state. If the actual colour is lighter than or the same as that of the reference colour tag, the thermally sensitive article has failed or deteriorated, and is in an unusable quality state.

The reference colour tag may be independent of the indication function layer and the adsorption function layer. Preferably, the reference colour tag is included in the indication function layer. Preferably, after coating the volatile dye layer, a non-volatile dye or a non-volatile pigment having the end colour difference is coated around the volatile dye layer to form the reference colour tag. The reference colour tag may be arranged nearby the volatile dye layer in any possible manner, for example the reference colour tag is arranged abreast with the volatile dye layer, or arranged around the volatile dye layer, or the like. More preferably, the first substrate material layer per se is prepared as the reference colour tag.

For example, if a thermally sensitive article will deteriorate or fail after time t1 at temperature T1, then the time-temperature indicator of the present invention is subjected to a treatment for the time t1 at temperature T1, and the colour difference of the volatile dye layer after the treatment is recorded as the end colour difference.

The thermally sensitive article is selected from vaccines, biological articles, bioactive samples, medicines, food or drinks. Preferably, the thermally sensitive article is an article which needs to be stored and/or transported at a temperature in the range from −40° C. to 50° C., preferably from −30° C. to 40° C., preferably from −30° C. to 30° C., preferably from −20° C. to 20° C., preferably from −20° C. to 10° C., preferably from −10° C. to 10° C., preferably from 0° C. to 10° C., such as from 2° C. to 8° C. For example, it may be any article which needs to be stored and/or transported at a temperature in the range from 2° C. to 8° C. recorded in volumes one, two and three of "Chinese Pharmacopoeia", edition 2005 or 2010. The thermally sensitive article includes but is not limited to: vaccines, such as thermally instable vaccines, such as polio vaccine, typhoid vaccine, hepatitis B vaccine and the like; biological articles, such as human immunoglobulin, anti-human T lymphocyte porcine immunoglobulin, and the like; bioactive samples, such as plasma, whole blood, serum and the like; medicines, such as posterior pituitary injection, etifenin and stannous chloride for Injection and the like; food, such as fresh meat, fresh fish and the like; drinks, such as fresh milk, diary, yoghurt, pasteurized milk and the like.

In the present invention, the difference between the activation energy of the volatilization process of the volatile dye layer and the activation energy of the quality change or failure process of the thermally sensitive article is in a predetermined range, and preferably the difference is in a range of ±10 kJ/mol, more preferably ±5 kJ/mol. Preferably, the activation energy of the volatilization process of the volatile dye layer is 60-140 kJ/mol. The activation energy of the volatilization process of the volatile dye layer described in the present invention refers to the apparent activation energy of the time-temperature indicator of the present invention in use during the volatilization process of the volatile dye layer.

Preferably, the volatile dye layer is in solid or liquid state at a temperature in the range of 0-80° C., more preferably in solid state at a temperature in the range of 0-50° C.

In the present invention, the volatile dye is not particularly limited, and any volatile dye which can achieve the object of the present invention may be used. Preferably, the volatile dye is at least one selected from azo dyes, anthraquinone dyes, compounds of formula I and the derivatives thereof, or the combination thereof, wherein the compounds of formula I have the following formula:

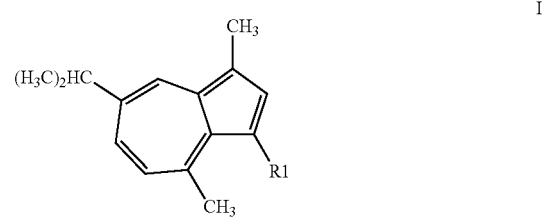

wherein,

R1 is selected from the group consisting of hydrogen, halogen, $C_{1-6}$ linear or branched alkyl, such as methyl, ethyl, n-propyl, isopropyl, n-butyl, sec-butyl, tert-butyl, n-pentyl, isopentyl, neopentyl, n-hexyl and the like; $C_{1-6}$ linear or branched alkoxy, such as methoxy, ethoxy, propoxy, isopropoxy, butoxy, sec-butoxy, tert-butoxy, pentyloxy, isopentyloxy, neopentyloxy, hexyloxy and the like; —COR2, —COOR2;

R2 is selected from the group consisting of hydrogen, $C_{1-6}$ linear or branched alkyl, such as methyl, ethyl, n-propyl, isopropyl, n-butyl, sec-butyl, tert-butyl, n-pentyl, isopentyl, neopentyl, n-hexyl and the like; $C_{1-6}$ linear or branched alkylamino, such as methylamino, ethylamino, propylamino, isopropylamino, butylamino, sec-butylamino, tert-butylamino, pentylamino, isopentylamino, neopentylamino, hexylamino and the like.

More preferably, the volatile dye is selected from the compound of formula I.

Preferably, the volatile dye layer also contains one or more volatilization additives. In the present invention, the volatilization additive is not particularly limited, and any volatilization additive which can achieve the object of the present invention may be used. The volatilization additive herein may accelerate or slow down the volatilization of the volatile dye. Preferably, the volatilization additive is one or more selected from the following volatile compounds:

linear alkanes, branched alkanes, cycloalkanes or aromatic hydrocarbons, such as hexane, heptane, octane or the isomer thereof, cyclohexane, cycloheptane, cyclopentane, naphthalene, anthracene and the like;

linear or branched or aromatic or cyclic alcohols, such as butantetraol, lauryl alcohol, tridecanol, tetradecanol, pentadecanol, hexadecanol, stearyl alcohol and the like;

linear or branched or aromatic or cyclic carboxylic acids, such as maleic acid, fumaric acid, lauric acid, tridecanoic acid, myristic acid, pentadecanoic acid, palmitic acid, adipic acid, sebacic acid, dodecanedioic acid and the like;

amino acids, such as aminobenzoic acid, leucine, phenylalanine and the like;

esters;

sulfones, such as diphenyl sulfone, diphenyl disulfone, dibenzyl sulfone, dibutyl sulfone and the like;

and various volatile natural materials, including naphthalene, camphor and the like;

Preferably, the volatile dye layer also contains one or more solvents. In the present invention, the solvent is not particularly limited, and any solvent which can achieve the object of the present invention may be used. Preferably, the solvent is one or more selected from the group consisting of water, hexane, cyclohexane, tetrahydrofuran, benzene, dimethylbenzene, methanol, ethanol, isopropyl alcohol, 2-butanol, acetone, diethyl ether, methyl acetate, ethyl acetate, carbon tetrachloride, chloroform, dichloromethane and dichloroethane.

Preferably, the volatile dye layer is formed on the first substrate material layer after mixing the volatile dye, volatilization additive and the solvent. The coating method is not particularly limited, and any coating method may be used as long as the volatile dye layer is formed. For example, any known method to form coating, such as spraying, printing, smearing and the like, may be used.

Preferably, the adsorption material of the present invention irreversibly adsorbs the dye volatilized from the volatile dye layer, and more preferably, the rate of the adsorption in which the adsorption material adsorbs the volatile dye volatilized from the volatile dye layer is much higher than the volatilization rate of the volatile dye. When the rate of the adsorption in which the adsorption material adsorbs the volatile dye volatilized from the volatile dye layer is much higher than the volatilization rate of the volatile dye, the adsorption rate of the volatile dye is substantially merely related to the volatilization rate. Therefore, the volatilization rate of the dye is only influenced by the temperature, but not by for example the factor that it is blocked by the saturated vapour and/or almost saturated vapour produced by its volatilization, and the like. As the volatilization amount of the dye is only influenced by the temperature and the time, the thermal history of the temperature-time indicator can be reflected more accurately. Certainly, if it is required to reduce the volatilization rate of the volatile dye layer, the adsorption material with relatively low adsorption rate, such as the adsorption material in which the adsorption rate of the dye is lower than the volatilization rate of the dye, may also be used. In the present invention, the kind of the adsorption material is not particularly limited, and any adsorption material which can achieve the object of the present invention may be used. In one embodiment, the adsorption material includes, but is not limited to oily or aqueous adhesive, commercial adhesive paper, adhesive tape and the like.

In the present invention, the materials of the first substrate material layer and the second substrate material layer are not particularly limited, and any substrate material which can achieve the object of the present invention may be used. The same material or different materials may be used for the first substrate material layer and the second substrate material layer. Preferably, the first substrate material layer together with the first release film layer seals the volatile dye layer; the substrate material layer together with the second release film layer seals the adsorption material layer. Preferably, the first substrate material layer has a laminated structure, and a sealing adhesive layer, an adhesive layer and a third release film layer are comprised in sequence on the face opposite to the volatile dye layer on the substrate material layer. In use, the third release film layer is peeled off at first, and the adhesive layer of the first substrate material layer is pasted on the thermally sensitive layer. Then the first release film layer and the second release film layer are peeled off, the adsorption material layer is aligned with the volatile dye layer, and the adsorption material layer and the volatile dye layer are sealed together on the thermally sensitive article.

Preferably, the time-temperature indicator further comprises an isolation layer, and this isolation layer is located between the volatile dye layer and the adsorption material layer. In use, this isolation layer is located between the volatile dye layer and the first release film layer or between the adsorption material layer and the second release film layer. This isolation layer may be used for adjusting the volatilization rate of the volatile dye of the volatile dye layer. In the present invention, the material of the isolation layer is not particularly limited, and any material may be used as long as it may achieve the object of the present invention. Non-limiting examples include non-woven fabric, nylon P6 net, nylon P66 net and the like. When observing or determining the colour or colour difference of the volatile dye layer, this isolation layer together with the adsorption material layer is separated from the volatile dye layer. For example, the isolation layer may be coated after coating the volatile dye layer, and then the first release film layer is coated. Alternatively, the isolation layer is coated after coating the adsorption material layer, and then the second release film layer is coated.

In another embodiment, the method of the third aspect of the present invention comprises the following steps:

providing a first substrate material layer;

coating one or more areas on one side of the first substrate material layer with a volatile dye layer to form a volatile dye layer, wherein the difference between the activation energy of the volatilization process of the volatile dye layer and that of the quality change or failure process of the thermally sensitive article is in a predetermined range;

covering the volatile dye layer with a first release film, wherein the first release film layer together with the first substrate material layer seals the volatile dye layer therebetween, to form an indication function layer;

and providing a second substrate material layer;

coating one side of the second substrate material layer with adsorption material to form an adsorption material layer; wherein the adsorption material layer is larger than the volatile dye layer in dimension;

coating an adhesive layer around the adsorption material layer on the second substrate material layer; and covering the adhesive layer and the adsorption material layer with a second release film layer, and sealing the adsorption material layer between the second substrate material layer and the second release film layer to form an adsorption function layer.

In use, a time-temperature indicator is formed as follows: peeling off the first release film and the second release film, aligning the adsorption function layer with the volatile dye layer, pasting the second substrate material layer tightly pasted on the thermally sensitive article, and sealing the volatile dye layer together with the adsorption material layer between the first substrate material layer and the second substrate material layer.

Preferably, the first substrate layer has one or more transparent areas, and the colour of the volatile dye layer can be measured or observed through the area. More preferably, the first substrate layer per se is transparent, and the colour of the volatile dye layer can be measured or observed through the transparent first substrate layer.

The release film layer of the present invention is not particularly limited, and any release film layer which can achieve the object of the present invention may be used. It can be understood that the release film layer of the present invention may be readily selected by those skilled in the art according to the description of the present invention. In the present invention, the first, second, third and fourth release film layer have no effect of adsorbing the volatile dye. The material used in the release film layer may be widely selected, and non-limiting examples include paper, wax paper, and polymer film, such as polyethylene, polyvinyl chloride, polypropylene, polystyrene, polyethylene glycol terephthalate and the like.

As other features and the description and variation thereof in this embodiment are the same as or similar with those in the previous embodiment, they are not repeated here. For example, the volatile dye layer, the descriptions of the adsorption material layer, the isolation layer, the first release film layer, the second release film layer and the reference colour tag in this embodiment are the same as or similar with those in the previous embodiment; in this embodiment, the colour difference or colour depth of the volatile dye layer is observed or measured in the same manner as or similar with that of the previous embodiment; in this embodiment, the manner to determine whether the thermally sensitive article fails or deteriorates is the same as or similar with that of the previous embodiment. All the same or similar portions are not repeated here.

The fourth aspect of the present invention provides a method of detecting the quality state of a thermally sensitive article, and in one embodiment, the method of the fourth aspect of the present invention comprises the following steps:

providing a thermally sensitive article, which fails or deteriorates after time t1 at a desired treating temperature T1;

attaching the following layers on one or more areas of the thermally sensitive article:

a volatile dye layer, wherein the difference between the activation energy of the volatilization process of the volatile dye layer and that of the deterioration and failure process of the thermally sensitive article is in a predetermined range;

an adsorption material layer, which irreversibly adsorbs the dye volatilized from the volatile dye layer;

a sealing film layer, which is larger than the adsorption material layer and the volatile dye layer in dimension, and hermetically attaches the adsorption material layer and the volatile dye layer onto the thermally sensitive article;

treating the thermally sensitive article attached with the sealing film practically;

peeling off the adsorption material layer;

observing or determining the actual colour difference C2 in the volatile dye layer which has been treated practically;

wherein the end colour difference of the volatile dye layer after time t1 at temperature T1 is C1;

comparing the actual colour difference C2 with the end colour difference C1 of the volatile dye layer, wherein if the actual colour difference C2 of the volatile dye layer is larger than the end colour difference C1, it is indicated that the thermally sensitive article remains in effective quality state; if the actual colour difference C2 of the volatile dye layer is less than the end colour difference C1, it is indicated that the thermally sensitive article has already failed or deteriorated.

Preferably, before attaching the volatile dye layer, a layer of substrate material is attached on the thermally sensitive article.

Preferably, an isolation layer is attached between the volatile dye layer and the adsorption material layer.

In another embodiment, the method of the fourth aspect of the present invention comprises the following steps:

providing a thermally sensitive article, which fails or deteriorates after time t1 at a desired treating temperature T1;

attaching the following layers on one or more areas of the thermally sensitive article:

adsorption material layer;

volatile dye layer;

transparent sealing film layer;

wherein, the adsorption material layer irreversibly adsorbs the dye volatilized from the volatile dye layer, and the difference between the activation energy of the volatilization process of the volatile dye layer and that of the deterioration or failure process of the thermally sensitive article is in a predetermined range;

treating the thermally sensitive article attached with the sealing film practically;

observing or determining the actual colour difference C2 in the volatile dye layer which has been treated practically;

wherein the end colour difference of the volatile dye layer after time t1 at temperature T1 is C1;

comparing the actual colour difference C2 with the end colour difference C1 of the volatile dye layer, wherein if the actual colour difference C2 of the volatile dye layer is larger than the end colour difference C1, it is indicated that the thermally sensitive article remains in effective quality state; if the actual colour difference C2 of the volatile dye layer is less than the end colour difference C1, it is indicated that the thermally sensitive article has already failed or deteriorated.

Preferably, before attaching the adsorption material layer, a layer of substrate material is attached on the thermally sensitive article.

Preferably, an isolation layer is attached between the volatile dye layer and the adsorption material layer.

According to the fourth aspect of the present invention, preferably, after the thermally sensitive article on which all of the layers are attached is previously subjected to the deterioration and failure process, the colour difference of the thermally sensitive article when it fails or deteriorates is measured with a colorimeter, and recorded as the end colour difference. Before the thermally sensitive article is to be used, the actual colour difference of the volatile dye layer is measured with a colorimeter, and the actual colour difference is compared with the end colour difference. If the actual colour difference is larger than the end colour difference, the thermally sensitive article has not failed or deteriorated, and is in a usable quality state. If the actual colour difference is less than the end colour difference, the thermally sensitive article has failed or deteriorated, and is in an unusable quality state.

Preferably, a reference colour tag having the end colour difference is prepared with a non-volatile dye or a non-volatile pigment. Before the thermally sensitive article is to be used, the actual colour of the volatile dye layer is visually observed, and the actual colour is compared with the reference colour tag. If the actual colour is darker than the reference colour tag, the thermally sensitive article has not failed or deteriorated, and is in a usable quality state. If the actual colour is lighter than or the same as that of the reference colour tag, the thermally sensitive article has failed or deteriorated, and is in an unusable quality state.

The reference colour tag may be independent of the indication function layer and the adsorption function layer. Preferably, the reference colour tag is included in the indication function layer. Preferably, after coating the volatile dye layer, a non-volatile dye or a non-volatile pigment having the end colour differences coated around the volatile dye layer to form the reference colour tag. The reference colour tag may be arranged nearby the volatile dye layer in any possible manner, for example the reference colour tag is arranged abreast with the volatile dye layer, or arranged around the volatile dye layer, or the like For example, if a thermally sensitive article will deteriorate or fail after time t1 at temperature T1, then the thermally sensitive article on which all of the layers are attached is subjected to a treatment for the time t1 at temperature T1, and the colour difference of the volatile dye layer after the treatment is recorded as the end colour difference value.

The thermally sensitive article is selected from vaccines, biological articles, bioactive samples, medicines, food or drinks. Preferably, the thermally sensitive article is an article which needs to be stored and/or transported at a temperature in the range from −40° C. to 50° C., preferably from −30° C. to 40° C., preferably from −30° C. to 30° C., preferably from −20° C. to 20° C., preferably from −20° C. to 10° C., preferably from −10° C. to 10° C., preferably from 0° C. to 10° C., such as from 2° C. to 8° C. For example, it may be any article which needs to be stored and/or transported at a temperature in the range from 2° C. to 8° C. recorded in volumes one, two and three of "Chinese Pharmacopoeia", edition 2005 or 2010. The thermally sensitive article includes but is not limited to: vaccines, such as thermally instable vaccines, such as polio vaccine, typhoid vaccine, hepatitis B vaccine and the like; biological articles, such as human immunoglobulin, anti-human T lymphocyte porcine immunoglobulin, and the like; bioactive samples, such as plasma, whole blood, serum and the like; medicines, such as posterior pituitary injection, etifenin and stannous chloride for Injection and the like; food, such as fresh meat, fresh fish and the like; drinks, such as fresh milk, diary, yoghurt, pasteurized milk and the like.

In the present invention, the difference between the activation energy of the volatilization process of the volatile dye layer and the activation energy of the quality change or failure process of the thermally sensitive article is in a predetermined range, and preferably the difference is in a range of ±10 kJ/mol, more preferably ±5 kJ/mol. Preferably, the activation energy of the volatilization process of the volatile dye layer is 60-140 kJ/mol. The activation energy of the volatilization process of the volatile dye layer described in the present invention refers to the apparent activation energy of the time-temperature indicator of the present invention in use during the volatilization process of the volatile dye layer.

Preferably, the volatile dye layer is in solid or liquid state at a temperature in the range of 0-80° C., more preferably in solid state at a temperature in the range of 0-50° C.

In the present invention, the volatile dye is not particularly limited, and any volatile dye which can achieve the object of the present invention may be used. Preferably, the volatile dye is at least one selected from azo dyes, anthraquinone dyes, compounds of formula I and the derivatives thereof, or the combination thereof, wherein the compounds of formula I have the following formula:

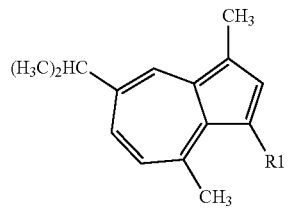

I wherein,

R1 is selected from the group consisting of hydrogen, halogen, $C_{1-6}$ linear or branched alkyl, such as methyl, ethyl, n-propyl, isopropyl, n-butyl, sec-butyl, tert-butyl, n-pentyl, isopentyl, neopentyl, n-hexyl and the like; $C_{1-6}$ linear or branched alkoxy, such as methoxy, ethoxy, propoxy, isopropoxy, butoxy, sec-butoxy, tert-butoxy, pentyloxy, isopentyloxy, neopentyloxy, hexyloxy and the like; —COR2, —COOR2;

R2 is selected from the group consisting of hydrogen, $C_{1-6}$ linear or branched alkyl, such as methyl, ethyl, n-propyl, isopropyl, n-butyl, sec-butyl, tert-butyl, n-pentyl, isopentyl, neopentyl, n-hexyl and the like; $C_{1-6}$ linear or branched alkylamino, such as methylamino, ethylamino, propylamino, isopropylamino, butylamino, sec-butylamino, tert-butylamino, pentylamino, isopentylamino, neopentylamino, hexylamino and the like.

More preferably, the volatile dye is selected from the compound of formula I.

Preferably, the volatile dye layer also contains one or more volatilization additives. In the present invention, the volatilization additive is not particularly limited, and any volatilization additive which can achieve the object of the present invention may be used. The volatilization additive herein may accelerate or slow down the volatilization of the volatile dye. Preferably, the volatilization additive is one or more selected from the following volatile compounds:

linear alkanes, branched alkanes, cycloalkanes or aromatic hydrocarbons, such as hexane, heptane, octane or the isomer thereof, cyclohexane, cycloheptane, cyclopentane, naphthalene, anthracene and the like;

linear or branched or aromatic or cyclic alcohols, such as butantetraol, lauryl alcohol, tridecanol, tetradecanol, pentadecanol, hexadecanol, stearyl alcohol and the like;

linear or branched or aromatic or cyclic carboxylic acids, such as maleic acid, fumaric acid, lauric acid, tridecanoic acid, myristic acid, pentadecanoic acid, palmitic acid, adipic acid, sebacic acid, dodecanedioic acid and the like;

amino acids, such as aminobenzoic acid, leucine, phenylalanine and the like;

esters;

sulfones, such as diphenyl sulfone, diphenyl disulfone, dibenzyl sulfone, dibutyl sulfone and the like;

and various volatile natural materials, including naphthalene, camphor and the like;

Preferably, the volatile dye layer also contains one or more solvents. In the present invention, the solvent is not particularly limited, and any solvent which can achieve the object of the present invention may be used. Preferably, the solvent is one or more selected from the group consisting of water, hexane, cyclohexane, tetrahydrofuran, benzene, dimethylbenzene, methanol, ethanol, isopropyl alcohol, 2-butanol, acetone, diethyl ether, methyl acetate, ethyl acetate, carbon tetrachloride, chloroform, dichloromethane and dichloroethane.

Preferably, the volatile dye layer is formed on the first substrate material layer after mixing the volatile dye, volatilization additive and the solvent. The coating method is not particularly limited, and any coating method may be used as long as the volatile dye layer is formed. For example, any known method to form coating, such as spraying, printing, smearing and the like, may be used.

Preferably, the adsorption material of the present invention irreversibly adsorbs the dye volatilized from the volatile dye layer, and more preferably, the rate of the adsorption in which the adsorption material adsorbs the volatile dye volatilized from the volatile dye layer is much higher than the volatilization rate of the volatile dye. When the rate of the adsorption in which the adsorption material adsorbs the volatile dye volatilized from the volatile dye layer is much higher than the volatilization rate of the volatile dye, the adsorption rate of the volatile dye is substantially merely related to the volatilization rate. Therefore, the volatilization rate of the dye is only influenced by the temperature, but not by for example the factor that it is blocked by the saturated vapour and/or almost saturated vapour produced by its volatilization, and the like. As the volatilization amount of the dye is only influenced by the temperature and the time, the thermal history of the thermally sensitive article can be monitored more accurately. Certainly, if it is required to reduce the volatilization rate of the volatile dye layer, the adsorption material with relatively low adsorption rate, such as the adsorption material in which the adsorption rate is lower than the volatilization rate of the dye, may be selected. In the present invention, the kind of the adsorption material is not particularly limited, and any adsorption material which can achieve the object of the present invention may be used. In one embodiment, the adsorption material includes, but is not limited to oily or aqueous adhesive, commercial adhesive paper, adhesive tape and the like.

In the present invention, the materials of the first substrate material layer and the second substrate material layer are not particularly limited, and any substrate material which can achieve the object of the present invention may be used. The same material or different materials may be used for the first substrate material layer and the second substrate material layer.

The fifth aspect of the present invention provides a compound, having a structure of formula I:

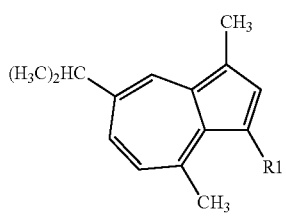

I wherein,

R1 is selected from the group consisting of hydrogen; halogen; $C_{1-6}$ linear or branched alkyl, such as methyl, ethyl, n-propyl, isopropyl, n-butyl, sec-butyl, tert-butyl, n-pentyl, isopentyl, neopentyl, n-hexyl and the like; $C_{1-6}$ linear or branched alkoxy, such as methoxy, ethoxy, propoxy, isopropoxy, butoxy, sec-butoxy, tert-butoxy, pentyloxy, isopentyloxy, neopentyloxy, hexyloxy and the like; —COR2, —COOR2 and the like;

R2 is selected from the group consisting of hydrogen; $C_{1-6}$ linear or branched alkyl, such as methyl, ethyl, n-propyl, isopropyl, n-butyl, sec-butyl, tert-butyl, n-pentyl, isopentyl, neopentyl, and n-hexyl; $C_{1-6}$ linear or branched alkylamino, such as methylamino, ethylamino, propylamino, isopropylamino, butylamino, sec-butylamino, tert-butylamino, pentylamino, isopentylamino, neopentylamino, and hexylamino; and the like.

In the compound according to the fifth aspect of the present invention,

R1 is selected from hydrogen, —COR2 and —COOR2;

R2 is selected from the group consisting of hydrogen; $C_{1-4}$ linear or branched alkyl, such as methyl, ethyl, n-propyl, isopropyl, n-butyl, sec-butyl, and tert-butyl; $C_{1-4}$ linear or branched alkylamino, such as methylamino, ethylamino, propylamino, isopropylamino, butylamino, sec-butylamino, tert-butylamino, pentylamino, isopentylamino, neopentylamino, and hexylamino; and the like.

In the compound according to the fifth aspect of the present invention, R1 is selected from hydrogen, —COOH, —COOCH$_3$, —COOCH$_2$CH$_3$, —COOCH$_2$CH$_2$CH$_3$, —COOCH(CH$_3$)$_2$ and the like.

Throughout the present invention, the compound in which R1 is respectively —COOH, —COOCH2CH3 and —COOCH(CH3)2 may be respectively called dye A, dye B and dye C for short.

The entire content of the documents cited in the present application is incorporated herein by reference. Unless otherwise described herein, various terms and phrases in the present application have the general meanings which are known to those skilled in the art.

As described herein, the term "deterioration" refers to that the thermally sensitive article loses the original quality state or can not meet the quality requirement after a certain time of storage and transport. In the storage and transport, food and medicines always deteriorate due to heat or other factors. In general case, the higher the storage and transport temperature is, the higher the deterioration rate. The thermally sensitive article usually has a specified storage and transport temperature, and thus has a certain quality guarantee period or shelf life. If the storage and transport temperature of the thermally sensitive article exceeds the specified storage and transport temperature, the deterioration rate is accelerated and the quality guarantee period is shortened. In the prior art, many food and medicines only indicate the specified storage and transport temperature and quality guarantee period thereof, but it can not be found out whether the actual storage and transport temperature during the storage and transport is always kept below the specified storage and transport temperature. In the present invention, it is surprisingly found that the volatilization rate of the dye in the volatile dye layer can be made close to or consistent with the quality change rate of the thermally sensitive article, i.e. the colour fading rate of the volatile dye layer is close to or consistent with the quality change rate of the thermally sensitive article, by adjusting the activation energy of the volatilization process of the volatile dye layer, so that the quality change of the thermally sensitive article can be accurately monitored. When the storage and transport temperature increases, the volatilization rate of the volatile dye layer increases, and the colour fading rate increases, so the time to reach the end colour difference or the end colour is shortened, indicating that the quality guarantee period of the thermally sensitive article is correspondingly shortened. When the colour difference of the time-temperature indicator of the present invention reaches or is less than the end colour difference, i.e. the colour thereof equals to the end colour or is lighter than the end colour, it is indicated that the thermally sensitive article has deteriorated, although the storage and transport time of this thermally sensitive article has not reached the labelled quality guarantee period. Therefore, with the time-temperature indicator of the present invention or the method for monitoring the quality state of a thermally sensitive article of the present invention, the quality state of a thermally sensitive article can be monitored more accurately, and the use safety of the thermally sensitive article can be ensured.

As described herein, the term "failure" refers to that the thermally sensitive article loses the original efficacy or can not meet the quality requirement after a certain time of storage and transport. For example, before using the vaccines, the activity thereof should meet the specified standard, and after storage and transport, if the activity thereof can not meet the specified standard, such vaccines may be thought to fail and can not be used. For example, if the activity of the vaccines after storage and transport is specified to be 90% or more, it is thought to fail that this activity goes below 90%. There are different failure standards for different thermally sensitive articles. When using the time-temperature indicator of the present invention, the end colour difference thereof should be measured according to failure standards of different thermally sensitive articles. The failure process of the thermally sensitive article is closely related to the temperature of the storage and transport process thereof. When the temperature increases, the failure process of the thermally sensitive article is accelerated, i.e. the failure rate increases, and the quality guarantee period thereof is shortened. Currently, for many thermally sensitive articles, only the storage and transport temperature and the quality guarantee period thereof are specified, but the thermal history thereof is not detected. The user can not find out whether the storage and transport temperature during the storage and transport exceeds the specified storage and transport temperature. In the present invention, it is surprisingly found that the volatilization rate of the dye in the volatile dye layer can be made close to or consistent with the failure rate of the thermally sensitive article, i.e. the colour fading rate of the volatile dye layer is close to or consistent with the failure rate of the thermally sensitive article, by adjusting the activation energy of the volatilization process of the volatile dye layer, so that the failure of the thermally sensitive article can be accurately monitored. When the storage and transport temperature increases, the volatilization rate of the volatile dye layer increases, and the colour fading rate increases, so the time to reach the end colour difference or the end colour is shortened, indicating that the quality guarantee period of the thermally sensitive article is correspondingly shortened. When the colour difference of the time-temperature indicator of the present invention reaches or is less than the end colour difference, i.e. the colour thereof equals to the end colour or is lighter than the end colour, it is indicated that the thermally sensitive article has failed, although the storage and transport time of this thermally sensitive article has not reached the labelled quality guarantee period. Therefore, with the time-temperature indicator of the present invention or the method for monitoring the failure of a thermally sensitive article of the present invention, the failure of a thermally sensitive article can be monitored more accurately, whether the thermally sensitive article fails can be determined more accurately, and the use safety of the thermally sensitive article can be ensured. This plays an important role in the fields of vaccines, medicines, food and the like.

As described herein, the term "the activation energy of the failure or deterioration process of a thermally sensitive article" refers to the activation energy E of a thermally sensitive article in the Arrhenius equation $$\log k = -\frac{E}{2.303\ RT} + \log A$$

during the failure or deterioration process, and this activation energy refers to the apparent activation energy of a thermally sensitive article during actual failure or deterioration process. Not limited to any theory, the inventor of the present invention considers that the failure or deterioration process of a thermally sensitive article obeys the Arrhenius equation. In practice, the failure or deterioration rate of the thermally sensitive article is measured with the thermally sensitive article under at least two different temperatures, preferably 5 or more temperatures, more preferably under 10 or more temperatures. Then a curve of log k as a function of temperature T is plotted in a rectangular coordinate system, and this curve is a straight line or almost a straight line. The apparent activation energy and the constant A of the failure or deterioration process of the thermally sensitive article can be obtained from the slope and intercept of this straight line.

Similarly, the term "the activation energy of the volatilization process of the volatile dye layer" refers to the activation energy E of the volatile dye layer in the Arrhenius equation $$\log k = -\frac{E}{2.303\ RT} + \log A$$

during the volatilization process, and this activation energy refers to the apparent activation energy of the volatile dye layer of the time-temperature indicator of the present invention during actual volatilization process. Not limited to any theory, the inventor of the present invention considers that the volatilization process of the volatile dye layer obeys the Arrhenius equation. In practice, the volatilization rate of the volatile dye layer is measured with the time-temperature indicator of the present invention under at least two different temperatures, preferably under 5 or more temperatures, more preferably 10 or more temperatures. Then a curve of log k as a function of temperature T is plotted in a rectangular coordinate system, and this curve is a straight line or almost a straight line. The apparent activation energy and the constant A of the volatilization process of the volatile dye layer of the time-temperature indicator of the present invention can be obtained from the slope and intercept of this straight line.

In the present invention, the apparent activation energy and the constant A of the volatilization process of the volatile dye layer can be controlled by selecting the volatile dye and/or the volatilization additive and/or the solvent and the amount thereof, and can be made close to or even consistent with the apparent activation energy and the constant A of the failure or deterioration process of the thermally sensitive article, so that the dye volatilization rate of the volatile dye layer is made close to or even consistent with the deterioration rate or failure rate of the thermally sensitive article, and the thermal history of the thermally sensitive article is accurately monitored according to the colour change of the volatile dye layer.

Herein, the activation energy defined herein is represented with E or Ea.

As described herein, the term "colour difference" refers to the colour which is measured with a colorimeter and represented with a number. L*a*b* colour space (also known as CIELAB) is used. In this colour space, L* represents brightness, and a* and b* are chromatic coordinates. a* and b* represent the directions of colours, +a* represents the direction of red, −a* represents the direction of green, +b* represents the direction of yellow, and −b* represents the direction of blue. The center is colourless, and when the values of a* and b* increase and move out from the center, the colour saturation increases. Colorimeter is widely used for accurately measuring the colour difference. In the L*a*b* colour space, the colour difference may be represented as a single numerical value with ΔE*ab, and it represents the magnitude of the colour difference, but does not indicate that in which aspect the colours are different. ΔE*ab is defined as follows:

$$\Delta E^*ab = [(\Delta L^*)^2 + (\Delta a^*)^2 + (\Delta b^*)^2]^{0.5}$$

Although the colour difference may decrease with the volatilization of the dye, for the white standard, when the ΔE*ab measured is 10 or less, such a change can hardly be observed by human eyes. Therefore, ΔE*ab which is 10 or more may be defined as the end colour difference, so that the user can compare the colour depth directly through visually observing. For example, ΔE*ab which equals to 10, 15, 20, 25 or the like may be defined as the end colour difference. When preparing the time-temperature indicator of the present invention, the initial colour difference C0 can be readily determined according to the predetermined end colour difference, the volatilization rate of the volatile dye layer actually measured and the corresponding colour fading rate. In other words, if the initial colour difference C0 is defined as above and the colour difference of the volatile dye layer is made to be C0, then after the time-temperature indicator is subjected to a treatment process same as the failure or deterioration process of the thermally sensitive article, the end colour difference thereof is just the predetermined colour difference, for example ΔE*ab equals to 10, 15, 20, 25 or the like. After C0 is determined, the volatile dye layer with C0 can be obtained by adjusting factors such as the kind and content of the volatile dye in the volatile dye layer, and the kind and content of the volatilization additive, the solvent and the like. In addition, it can be understood that when the actual colour difference is compared with the end colour difference by visual observation, the initial colour difference of the volatile dye layer C0 should be large enough to ensure that the colour of the reference colour tag with the end colour difference is in the range which can be distinguished by human eyes, i.e. the end colour difference value should be 10 or more, such as 10, 15, 20, 25 or more.

As the user only needs to compare the depth of the colour during the visual comparison of the colour depth, ΔE*ab can be directly compared, without determining the particular values of L*, a* and b*. Therefore, volatile dye of any colour can be used in the time-temperature indicator of the present invention.

In the present invention, "the time-temperature indicator of the present invention is subjected to a process same as the failure or deterioration process of the thermally sensitive article" or similar description has the following meaning: if the thermally sensitive article fails or deteriorates after time t1 at temperature T1, and does not fail or deteriorate before time t1, then the time-temperature indicator is kept at temperature T1 for time t1. For example, the quality guarantee period of some vaccine at −8° C. is two years, so the time-temperature indicator of the present invention may be kept at −8° C. for two years to determine the end colour difference or the end colour thereof. However, in practice, if the quality guarantee period of a thermally sensitive article is too long, then the time period to determine the time-temperature indicator of the present invention is too long, and this is not realistic. Therefore, the end colour difference or the end colour can be determined according to accelerated testing which is known to those in the art, or specified for a particular thermally sensitive article, or commonly used. For example, the method stated in related textbooks, such as the contents of the sections related to the stability of materials such as medicines, please refer to Physical Chemistry, the People's Education Press, 1979, edited by Tianjin University; Su, Desen et al, Physicalpharmacy, Chemical Industry Press, Beijing, 2004; Nianzhu Xi, Pharmaceutics, the third edition, People's Medical Publishing House, Beijing, 1994, et al. For example, conventional test method stated in the textbook (Nianzhu Xi, Pharmaceutics, the third edition, People's Medical Publishing House, Beijing, 1994, p 141) is referenced. For example, if after the above vaccine with a valid period of 2 years at 2-8° C. is kept at 25° C. for 8 weeks, the activity thereof decreases to the standard specified low limit of 90%, then the time-temperature indicator of the present invention may be kept at 25° C. for 8 weeks, and the colour difference of the volatile dye layer thereof is determined as the end colour difference. Compared with being kept at 2-8° C. for two years, the end colour difference or the end colour of the time-temperature indicator of the present invention can be determined more quickly in such a method. Moreover, the end colour difference or the end colour can also be determined by referencing the classical constant temperature method stated in the textbook (Nianzhu Xi, Pharmaceutics, the third edition, People's Medical Publishing House, Beijing, 1994, p 141). Such a method is usually based on the Arrhenius equation $$\log k = -\frac{E}{2.303\ RT} + \log A,$$

in which the parameters such as the activation energy E, the rate constant k, the absolute temperature T and the like are included.

It should be understood for those skilled in the art that "on the thermally sensitive article" or "on one or more areas of the thermally sensitive article" mentioned in the present invention includes "on the package of the thermally sensitive article" or "on one or more areas of the package of the thermally sensitive article", such as on the outer surface of the primary package (or the minimum package, such as an ampoule of vaccine) of vaccines, medicines and the like, such as the outer surface of a glass bottle of vaccine or medicine which is packaged with a glass bottle, or on the outer surface of a soft bag of plasma or milk which is packaged with a soft bag. There is no any limitation for the position of the area, but it should be relatively uniform. There is no any limitation for the dimension of the area either, but for the present invention, it is preferably 0.2-20 cm², more preferably 0.5-5 cm², more preferably 0.5-4 cm², more preferably 0.5-2.5 cm², more preferably 0.5-1 cm².

In the present invention, the reference colour tag or reference colour layer is prepared with a non-volatile dye or pigment. The kind of the non-volatile dye or pigment is not particularly limited in the present invention, and any non-volatile dye commercially available may be used as long as it can achieve the specified colour or colour difference.

As described herein, "whether the thermally sensitive article fails" mentioned refers to whether this article is in the range of the quality requirement specified by the valid period thereof. For example, taking the content of the active ingredient as example, some medicine specifies that the amount of the active ingredient thereof should be 90% or more of the labelled amount, so "whether to fail" can be determined according to whether the amount of the active ingredient of the medicine is 90% or more after it is stored and/or transported. For example, if the amount of the active ingredient is more than 90%, the medicine has not failed; if the amount of the active ingredient is less than 90%, it is indicated that the medicine has failed.

Many kinds of time-temperature indicator (TTI) are well known to those skilled in the art. For example, CN101652645A discloses a time-temperature indicator, comprising the following time-temperature indicator: the time-temperature indicator comprising at least one metal layer or metal-containing layer, and at least one doped polymer layer which is directly in contact with the metal layer or metal-containing layer, wherein the dopant is acid, base or salt, or photolatent acid or photolatent base, and it is added into the polymer, and/or at least one polymer layer, wherein the polymer is functionalized with latent acidic group or latent basic group; or comprising the following time-temperature indicator: the time-temperature indicator comprising at least one polymer layer which contains metal particles and photolatent acid or photolatent base, or at least one polymer layer which contains metal particles, wherein the polymer is functionalized with latent acidic or latent basic group. For another example, CN1914509A discloses a time-temperature indicator which comprises at least one indication compound in the form of the first isomer, and in the case that the atoms or chemical groups linked to the indication compound do not transfer in the isomerization reaction, the indication compound is converted into an indication compound in the form of the second isomer in the way which depends on the time and the temperature, wherein the formation of the indication compound in the form of the second isomer can be detected by monitoring the physical characteristics of the indication compound. However, according to the detailed description of the present invention, the time-temperature indicator of the present invention is distinct from the time-temperature indicator in the prior art in theory, structure and composition, and the time-temperature indicator of the present invention is very advantageous in production, costs, simplicity of use and the like. Certainly, the entire contents of the above patent documents are incorporated herein by reference for better understanding the present invention.

The "sealing adhesive layer" in the indication function layer or the adsorption material layer can prevent the dye from permeating through the substrate material layer and then transferring or even volatilizing. Although it is desired to use the substrate material layer which can prevent from the permeation and the transfer as far as possible in the present invention, it is preferred to coat the sealing adhesive layer on the side of the substrate material layer opposite to the dye layer for the object of the present invention. The material of the sealing adhesive or the sealing adhesive layer may be widely selected, and the non-limiting examples thereof include normal glue commercially available.

Similar with the "sealing adhesive layer", the "sealing film layer" in the indication function layer can prevent the dye from permeating through the substrate material layer and then transferring or even volatilizing. The material of the sealing film or the sealing film layer may be widely selected, and non-limiting examples include polymer film, such as polyethylene, polyvinyl chloride, polypropylene, polystyrene, polyethylene glycol terephthalate and the like.

The "adhesive layer" in the indication function layer or the adsorption function layer can provide adhesion effect and sealing effect for the corresponding material layer. The "adhesive layers" in two layers of the indication function layer and the adsorption function layer may be the same or different, but it is expected that the "adhesive layer" in the adsorption function layer has good sealing property, and an enclosed space which can prevent the dye from leaking can be formed by combining the substrate material layer with the thermally sensitive article tightly in the use of the indicator of the present invention. The material of the adhesive or the adhesive layer may be widely selected, and non-limiting examples include oily or aqueous adhesive, commercial adhesive paper, adhesive tape and the like.

In the present invention, the "quality", "quality state", "validity", "failure" and the like of the thermally sensitive article of the present invention are mentioned, and these conditions of the thermally sensitive article may be represented by titer, for example for some biological products; or may be represented by activity; or may also be represented by content, such as the content of the active ingredient. The representing methods of them are not particularly limited in the present invention.

In the present invention, the compound of formula I can be prepared by using the method known to those skilled in the art. For example, the compound of formula I in which R1 is hydrogen (it is referred as dye H in the present invention) may be used as the raw material, and the substituent R1 may be converted into halogen, $C_{1-6}$ linear or branched alkyl, $C_{1-6}$ linear or branched alcohol, —COR2, —COOR2 or the like through halogenation, alkylation, or acylation and then hydrolysis or alcoholysis, or the like, wherein R2 is as described in the present invention.

EXAMPLES

The present invention can be further described through the following various examples, but the scope of the present invention is not limited to the following examples. It can be understood by those skilled in the art that various variations and modifications of the present invention can be made without departing from the spirit and scope of the present invention. The materials and test methods used in the tests are generally and/or particularly described in the present invention. Although many materials and operation methods used to achieve the object of the present invention are known in the art, they are still described as detailedly as possible in the present invention.

A. The Examples of the Time-Temperature Indicator

The present invention makes use of the volatilization property of the material to prepare a time-temperature indicator, and achieves the desired colour change effect through a volatilization-adsorption process. The structure of the time-temperature indicator according to one example of the present invention and the working theory thereof are schematically represented in FIG. 1, FIG. 2A and FIG. 2B.

Figure 2A:
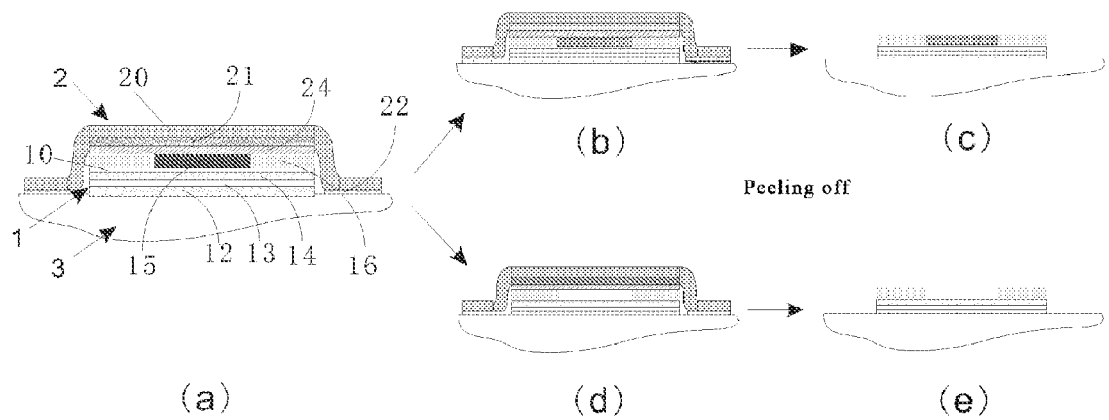
FIG. 2A is a schematic diagram of the use and colour change process of a time-temperature indicator prepared according to one example of the present invention.
Figure 2B:
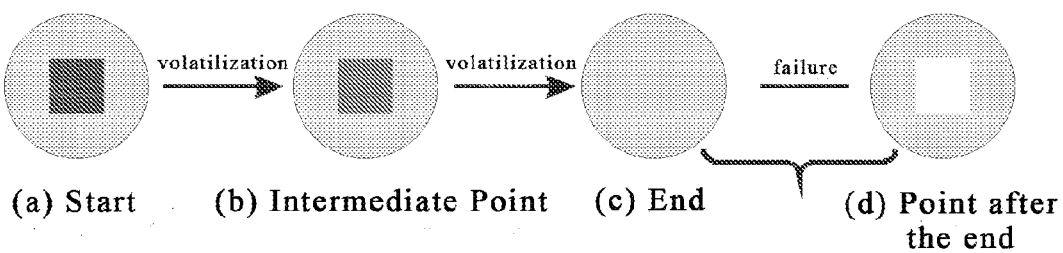
FIG. 2B is a schematic diagram of the use and colour change process of a time-temperature indicator prepared according to one example of the present invention.

FIG. 1 shows a time-temperature indicator according to one example of the present invention, which is consisted of two portions, wherein portion a is an indication function layer 1, and portion b is an adsorption function layer 2; the two portions are respectively prepared, stored and transported; and in use they are combined together and pasted on the surface of the container or package of the thermally sensitive article to be monitored.

In the indication function layer, a sealing adhesive layer is printed under the substrate material layer 10, and a layer of sealing film 13 is further printed under the sealing adhesive layer to prevent the volatile dye layer 15 from diffusing to a lower portion. An adhesive layer 12 is further printed under the sealing film 13, and is protected by the release film layer 11. If the sealing effect of the sealing adhesive is good enough, the sealing film 13 is not needed. If the substrate material layer 10 per se has enough sealing effect, the sealing adhesive layer 14 and the sealing film 13 are not needed. It is understood that the adhesive layer 12 is optional.

A layer of coloured functional material (i.e. volatile dye) is printed at the functional position on the substrate material layer 10 as a volatile dye layer, so as to form the volatile dye layer 15 in the present invention, and the colour of the volatile dye layer 15 (dark blue in the figure) appears very different from that of the substrate dye layer 10 or that of the reference colour layer 16 printed around the volatile dye layer 15 (light blue in the figure). The volatilization rate of the volatile dye used and the temperature effect thereof should be in consistent with the rate of the deterioration or the failure of the thermally sensitive article indicated and the temperature effect thereof as far as possible. After the indication function layer is printed and dried, it is sealed with a release film layer 17. This release film layer 17 is used for sealing, and has no adsorption effect for the volatile dye used. The sealing property ensures that the indication function layer can be stored and transported at room temperature.

In the adsorption function layer 2, adequate product information (such as the kind of the thermally sensitive article to which this TTI is applicable) or use information of the indicator (such as the information how to operate the indicator when it is required to use the indicator to determine whether the thermally sensitive article fails) may be printed on the substrate material layer 20. At a position corresponding to the position of the indication function layer under the substrate material layer 20, a layer of adsorption material which can effectively adsorb the thermally sensitive volatile dye volatilized is printed or coated to form an adsorption material layer 21, an adhesive layer 22 is printed around the adsorption material layer 21, and then the adsorption function layer 2 which is formed by laminating is sealed and preserved with a release film layer 23. If it is required to prevent the adsorption material from being directly contact with the volatile material (i.e. volatile dye), an isolation layer 24 which is optional may be further produced on the lower side (i.e. far away from the substrate material layer 20) of the adsorption material layer 21. Actually, the isolation layer may also be located between the dye layer 15 and the release film layer 17.

Further, FIG. 2 illustrates the use and use process of the time-temperature indicator shown in FIG. 1. In part a of FIG. 2A, two laminated portions, i.e., the indication function layer 1 and the adsorption function layer 2, which are respectively produced, stored and transported are combined: the release film 11 at the bottom of the indication function layer 1 is peeled off at first, and the indication function layer 1 is pasted on the surface of the container or package of the thermally sensitive article 3 to be monitored; the release film 17 of the indication function layer 1 and the release film 23 of the adsorption function layer 2 are peeled off, and the portion of the adsorption function layer 2 is aligned with the indication function layer 1 and pasted on the surface of the container or package of the thermally sensitive article 3 to be monitored. In a preferred embodiment, the shape and size of the adsorption material layer 21 are the same as or slightly larger than those of both the volatile dye layer 15 and the reference colour layer 16. Thus, as shown in the figure, the adsorption material layer 21 and optional isolation layer 24 completely cover both the volatile dye layer 15 and the reference colour layer 16, and the adhesive layer 22 at the periphery of the adsorption material layer 21 together with the substrate material layer adhered thereto can be tightly adhered to the package container of the thermally sensitive article 3, so that the substrate material layer 20, the adhesive layer 22 and the package container of the thermally sensitive article 3 together form a space which can seal both of the function layers. The selection of the substrate materials of the two function layers and the material of the adhesive ensures that the indication function layer will be tightly adhered to the surface of the container or the package of the product, and the adsorption function layer has suitable firmness when being adhered, can effectively seal the volatile dye printed in the indication function layer, and can be peeled off, wherein the process of peeling off does not influence the indication function layer negatively.

In the use process of this indicator, in the case that the volatile dye in the volatile dye layer 15 has not completely volatilized (part b in FIG. 2A), after the adsorption function layer 2 is peeled off, the dye (blue) left in the volatile dye layer 15 still appears a colour obviously difference from the reference colour layer 16 (light blue) at its periphery (part c in FIG. 2A), i.e. the colour of the volatile dye layer 15 is darker than that of the reference colour layer 16, reflecting that the product indicated is still valid and usable. In the case that the thermally sensitive material in the volatile dye layer has completely volatilized (part d in FIG. 2A), after the adsorption function layer 2 is peeled off, the dye (light blue or colourless) in the volatile dye layer 15 is close to or lighter than the colour of the reference colour layer 16 (light blue) at its periphery (part e in FIG. 2A), i.e. the colour of the volatile dye layer 15 is comparable with or lighter than that of the reference colour layer 16, indicating that the product monitored may deteriorate or fail due to overheat.

In FIG. 2B, the change process of the volatile dye layer 15 of a time-temperature indicator according to one example of the present invention during the use process is observed in a direction perpendicular to the indicator. It is indicated that the present invention makes use of the volatilization property of the material to prepare a time-temperature indicator, achieves the colour change of the functional position of the indicator through a volatilization-adsorption process, and shows whether the product using this time-temperature indicator deteriorates or fails due to overheat or too long a time. In this example, the volatile dye layer has a shape of square (seen in part a in FIG. 2B, i.e. the state at the start, it is a dark blue square), and the colour of this volatile dye layer appears much difference from that of the reference colour layer (seen in part (a) in FIG. 2B, the reference colour layer is a light blue round, and corresponds to the reference colour layer 16 in FIG. 1), wherein the reference colour layer 16 may be the substrate or a reference colour layer printed.

In the use process after the time-temperature indicator is combined with the thermally sensitive article, the colour depth of the reference colour layer 16 does not change, but the colour of the volatile dye layer 15 will become lighter due to the volatilization of the dye. The rate of becoming lighter is influenced by temperature. Even if it is under a storage and transport temperature which is specified for the thermally sensitive article, the volatile dye layer volatilizes at a certain rate. For example, for a medicine with a valid period of 2 years stored at 2-8° C., after this medicine has been stored strictly at 2-8° C. for 2 years, the volatile dye layer 15 will become lighter gradually due to the slow volatilization of the dye. At this time, the colour of the volatile dye layer will be darker or slightly darker than that of the reference colour layer 16, indicating that this medicine is still valid after being stored at 2-8° C. for two year. If the storage time extends, the volatile dye layer 15 will go on becoming lighter due to the continuous volatilization of the dye, and then the colour of the volatile dye layer will be close to or lighter than that of the reference colour layer 16, indicating that the medicine has expired. In the use process of the indicator, when the volatile dye layer has not completely volatilized, after the adsorption film is peeled off, the volatile dye left can still appear a colour obviously difference from the reference colour layer at the periphery (seen in part (b) in FIG. 2B, i.e. the state at the intermediate point), and the blue square is darker than the colour of the reference light-coloured round, reflecting that the product indicated is still valid. When the volatile dye layer continues to volatilize or has completely volatilized, after the adsorption film is peeled off, the colour of the volatile dye layer 15 is close to (part (c) in FIG. 2B, the state at the end) or lighter than (part (d) in FIG. 2B, the state of the point after the end) that of the reference colour layer at the periphery, so as to indicating that the product monitored may deteriorate or fail due to overheat.

B. The Preparation of the Time-Temperature Indicator and the Determination of the Colour of the Position in the Reference Colour Layer After the time-temperature indicator is produced according to the structure shown in FIG. 1, under different temperatures (such as 5° C., 10° C., 25° C. and/or 37° C.), the colour difference change at the functional position of the indicator over time is measured with a colorimeter, and the colour change rate of the indicator and the temperature effect thereof can be obtained.

The colour change can be digitalized with a colorimeter. When the colour change is measured with a colorimeter, a colour space such as L*a*b* colour space (also known as CIELAB colour space) is defined at first. In this colour space, L* represents brightness; a* and b* are the chromatic coordinates, and represent the directions of colours; +a* represents the direction of red, −a* represents the direction of green, +b* represents the direction of yellow, −b* represents the direction of blue, and the center is colourless. When the values of a* and b* increase and move out from the center, the colour saturation increases. In this colour space, the colour difference can be represented as a single numerical value;

$$\Delta E^*_{ab}[(\Delta L^*)^2+(\Delta a^*)^2+(\Delta b)^2]^{0.5}$$

wherein, $\Delta L^*$ is the change of brightness, $\Delta a^*$ is the change along the red-green colour axis, and $\Delta b^*$ is the change along the yellow-blue colour axis. The colour is quantified with a colorimeter such as Minolta CR-310 Chroma Meter or the like, so that the colour difference can be quantified, and the colour change function of the time-temperature indicator produced can be evaluated. A white substrate such as A4 paper is used as a reference in the measurement of the colour difference. When the colour difference $\Delta E^*_{ab}<10$, the colour is more or less close to the colour of the substrate. A further decrease in the colour difference is not notable for human eyes, so the colour difference $\Delta E^*_{ab}=10$ acts as the end of the colour change during the evaluation. In practical application, the end colour difference can be defined depending on the actual conditions, for example, depending on particular thermally sensitive article, $\Delta E^*_{ab}$ may be defined as other values, such as $\Delta E^*_{ab}=15$, $\Delta E^*_{ab}=20$, $\Delta E^*_{ab}=25$, and/or $\Delta E^*_{ab}=30$.

C. Description of the Design and Application of the Method or Indicator of the Present Invention with Particular Examples Example 1

Figure 3:
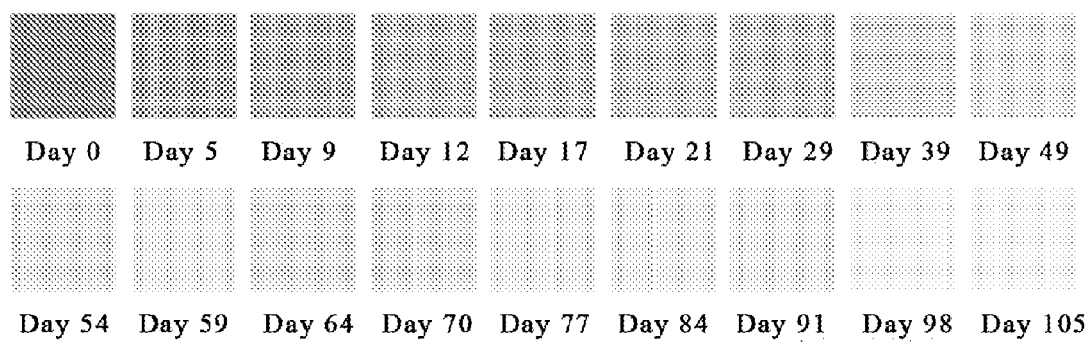
FIG. 3 is a schematic diagram of the use and colour change process of a time-temperature indicator prepared with dye A as the volatile dye in example 1 of the present invention.

Dye A is used as the volatile dye of the time-temperature indicator, and 2% of dye A is quantitatively printed on normal A4 paper (the solvent is ethyl acetate, the coating amount of dye A is about 200 μg per square centimeter) to form an indication function layer; commercial available adhesive paper which can effectively adsorb dye A is placed above dye A, and the adhesive faces to the dye layer to form an adsorption function layer; the indication function layer and the adsorption function layer are further sealed with a sealing film which is not permeable, and the sealed sample is kept at a constant temperature of 25° C. After standing for a certain time, the colour of the indicator is observed and recorded. FIG. 3 is the colour record of an indicator which has been kept at a constant temperature of 25° C. for 0-105 days. After dye A has completely volatilized, there is not any trace of the dye remaining under naked eyes, and the functional position of the indication almost returns to the original colour of the white paper.

Example 2

Figure 4A:
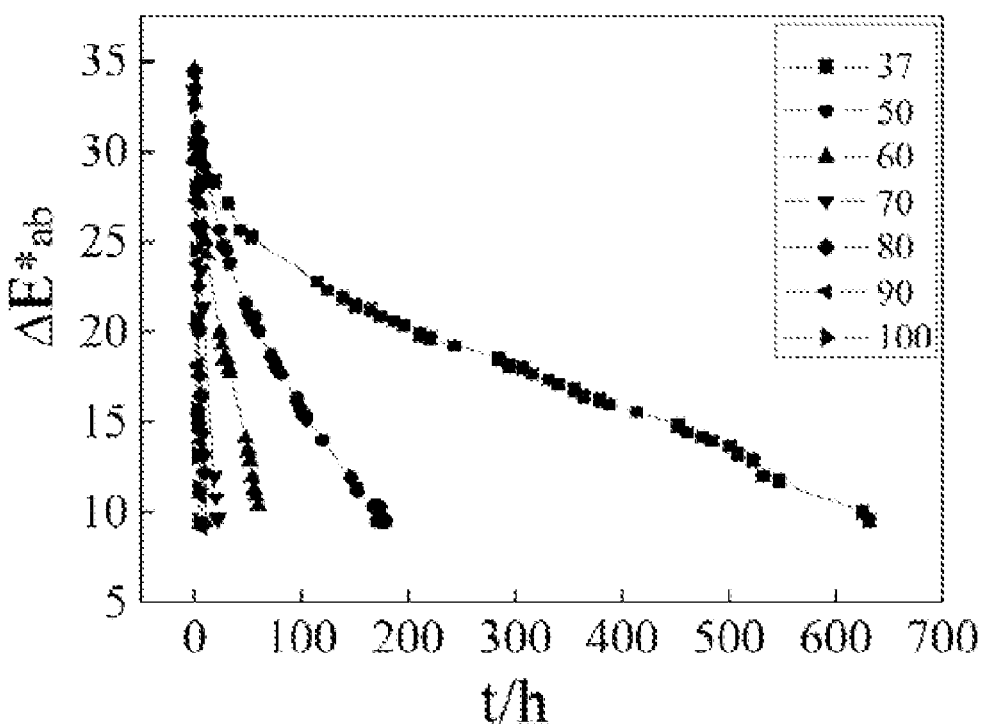
FIGS. 4A and 4B show the colour change rate of a time-temperature indicator prepared with dye A as the volatile dye in example 2 of the present invention at different temperatures.
Figure 4B:
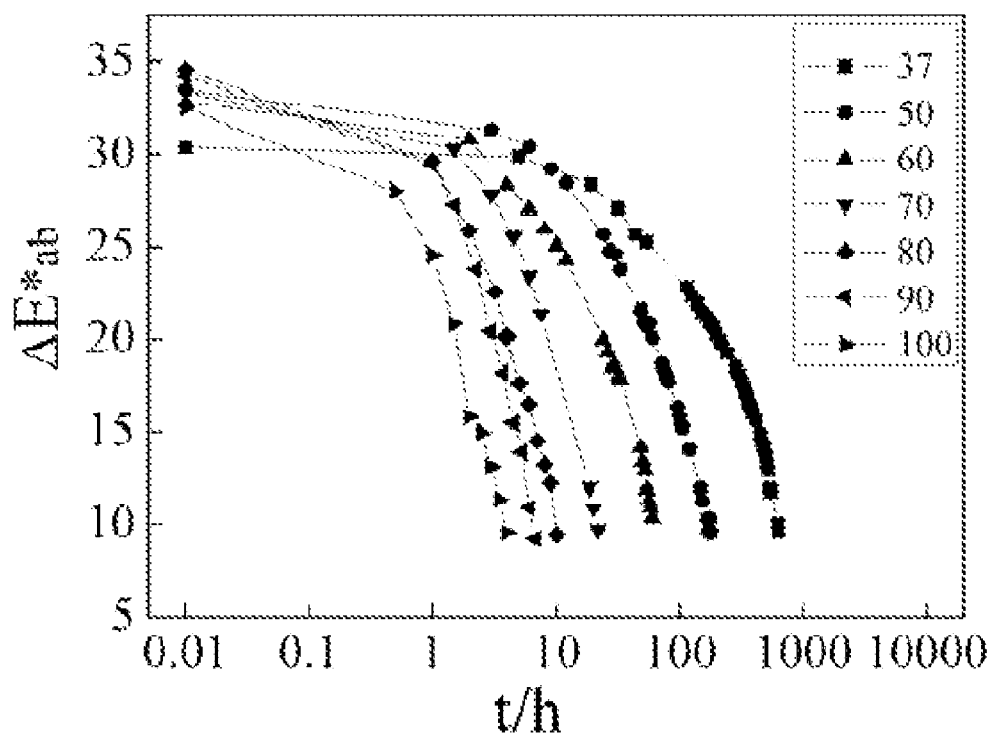
Figure 5:
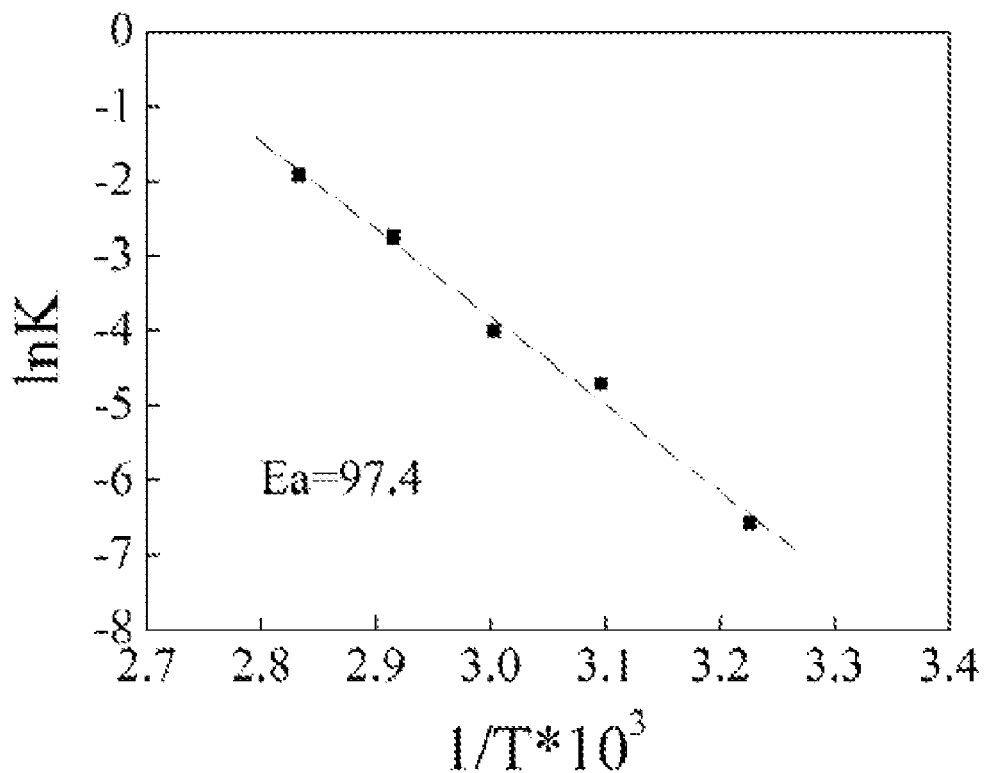
FIG. 5 shows the activation energy of the colour change process of a time-temperature indicator calculated with the colour difference $\Delta E^*_{ab}=10$ as the end point of the colour change, wherein the time-temperature indicator is prepared with dye A as the volatile dye in example 2 of the present invention.

FIGS. 4A and 4B show the change the colour difference $\Delta E^*_{ab}$ of a time-temperature indicator produced with dye A as the volatile dye according to the method in example 1 over time t at different temperatures. The colour change time and rate of this indicator can be calculated with the colour difference $\Delta E^*_{ab}=10$ as the end of the colour change, and the activation energy of the change process thereof can be further deduced as 97.4 kJ/mol (FIG. 5) from the Arrhenius equation, so as to obtain the characterization parameter of the temperature effect of the colour change process of the indicator. This activation energy can cover very well the activation energy range of 73.6-109 kJ/mol in which the literatures report that the polio vaccines are inactivated, and can also cover the activation energy range in which some other vaccines are inactivated.

Figure 6:
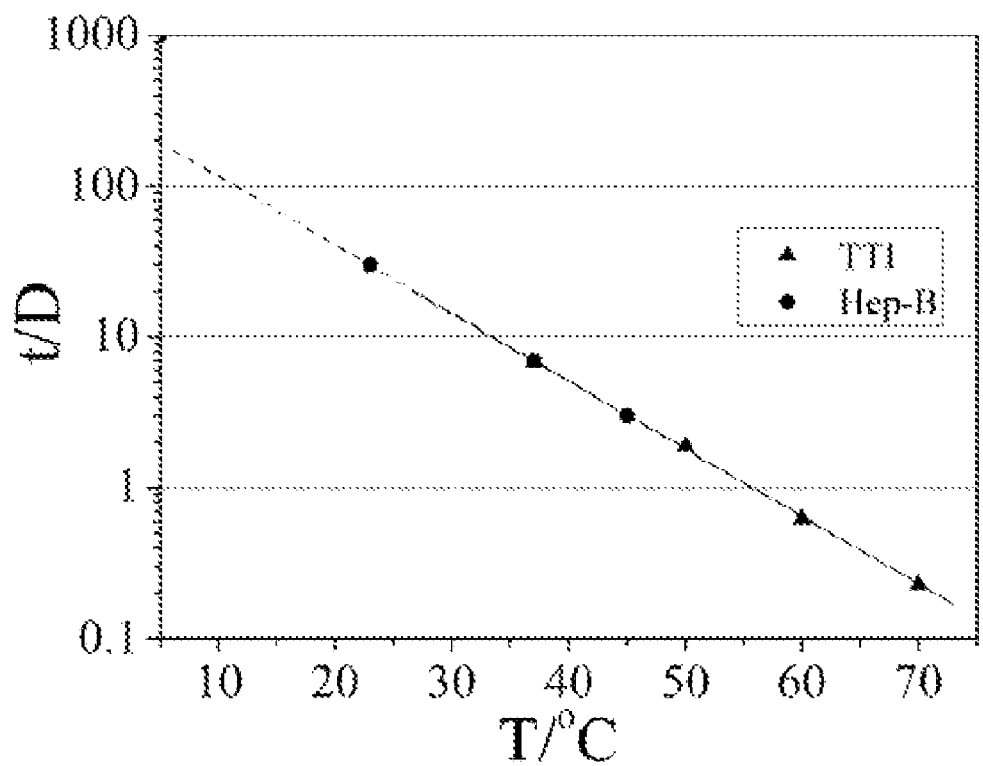
FIG. 6 shows that the colour change response of a time-temperature indicator is almost completely consistent with the activity change of a Hepatitis B vaccine (Hep-B), wherein the time-temperature indicator is prepared with dye A as the volatile dye and designed for the Hepatitis B vaccine (Hep-B) in example 2 of the present invention.

FIG. 6 shows a tag designed for a hepatitis B vaccine with dye A, and the colour change response of the TTI of the present invention is almost consistent with the activity change of the vaccine.

Example 3

The total time of the colour change of the indicator can be adjusted by adjusting the amount of the volatile dye printed per unit area at the functional indication position of the indicator, which can be adjusted by adjusting the inking amount or the concentration of the ink during the printing.

Figure 7:
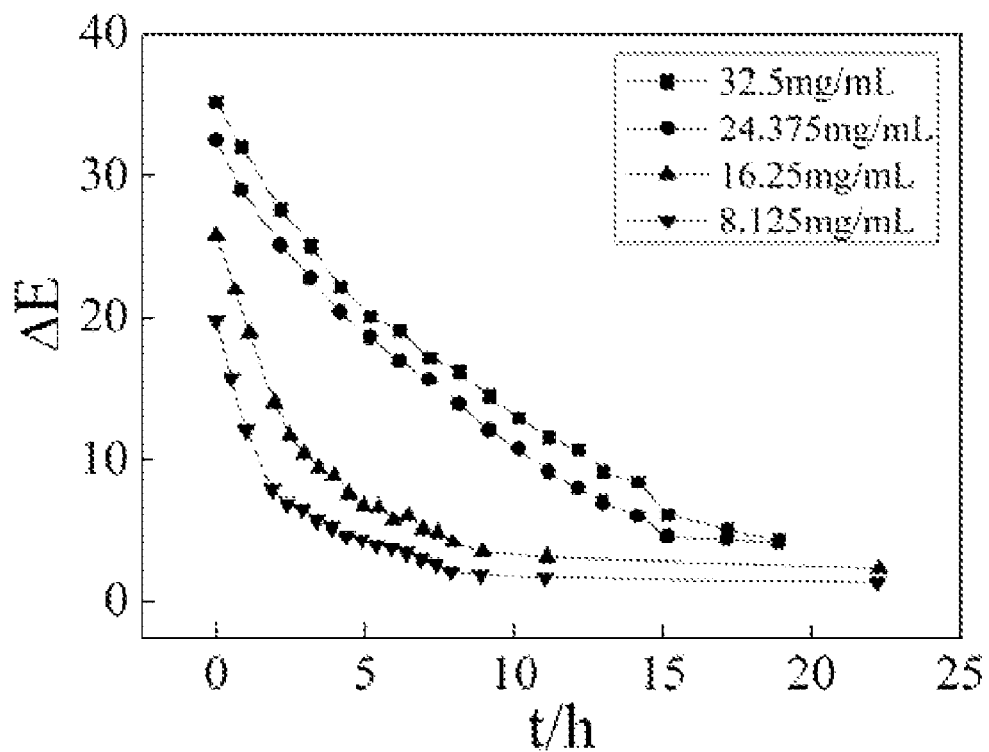
FIG. 7 shows the initial chroma of an indicator and the colour change process at the same temperature, wherein the indicator is prepared with dye A as the volatile dye through using different concentrations of ink (i.e. dye) and the same inking amount in example 3 of the present invention.
Figure 8:
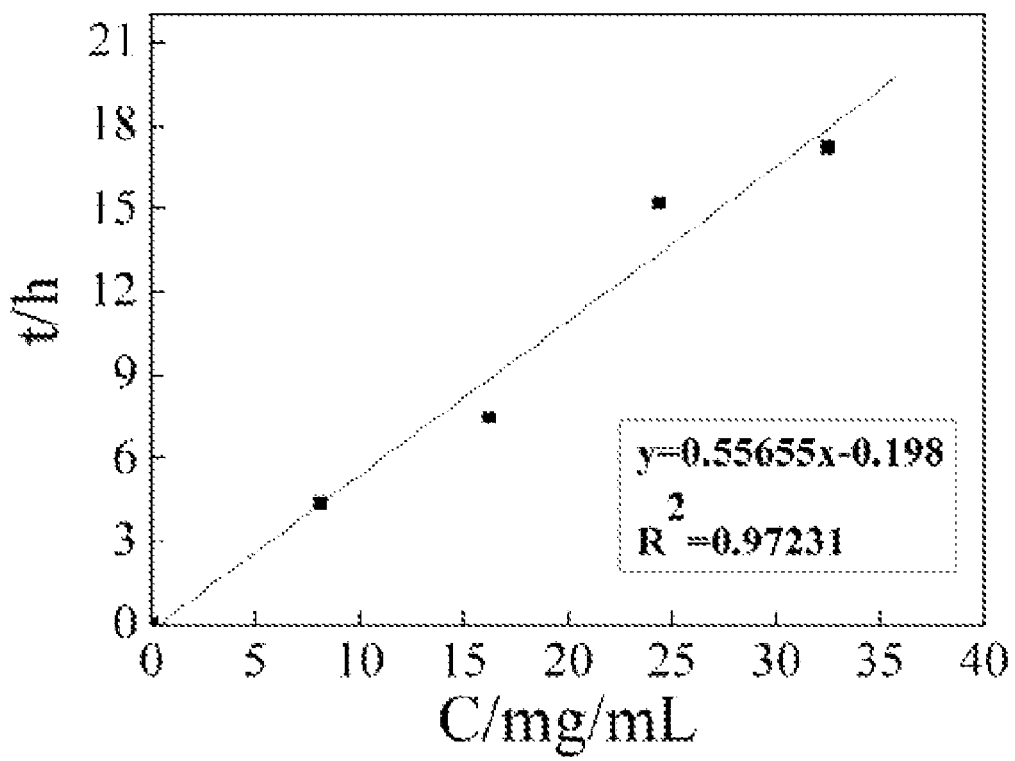
FIG. 8 shows that the time which the indicator spends to reach the end is in linear relation with the amount of the volatile dye printed per unit area, wherein the indicator is prepared with dye A as the volatile dye by using different concentrations of the ink and the same inking amount in example 3 of the present invention.

FIG. 7 shows the initial colour difference of an indicator and the colour change process at the same temperature, wherein the indicator is obtained with dye A as the volatile dye through using different concentrations of the ink and the same inking amount according to the method in example 1. The time which the indicator spends to reach the end is in linear relation with the amount of the volatile dye printed per unit area (FIG. 8).

Example 4

Figure 9:
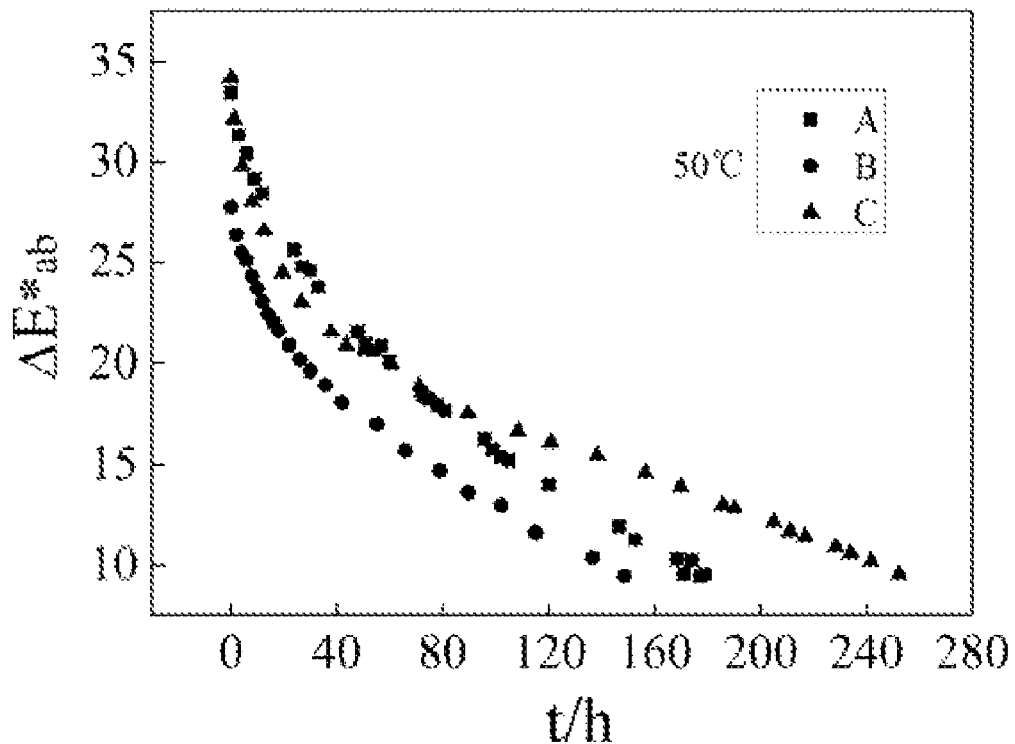
FIG. 9 shows the colour difference change of a time-temperature indicator over time at 50° C., wherein the time-temperature indicator is prepared with three compounds of formula I (dye A, dye B and dye C respectively) as the thermal sensitive material thereof in example 4 of the present invention.

The change time of the indicator and the temperature effect thereof can be adjusted by changing the composition and the structure of the dye. FIG. 9 shows the colour difference change of a time-temperature indicator over time at 50° C., wherein the time-temperature indicator is produced with three compounds of formula I (dye A, dye B and dye C respectively) as the volatile dye thereof according to the method in example 1. The colour change time and rate of this indicator at different temperatures can be calculated with the colour difference $\Delta E^*_{ab}=10$ as the end of the colour change, and the activation energies of the change process of the indicators in which dye B and dye C are respectively used as the volatile dyes can be further deduced as 122 and 75 kJ/mol respectively from the Arrhenius equation, so as to obtain the characterization parameter of the temperature effect of the colour change process of the indicator. It can be seen from the result that the activation energies of the indicators with dye B and dye C are different from that of the indicator with dye A. The dye B and dye C can be used for designing a TTI suitable for other thermally sensitive articles, or used for the combination of different dyes.

Example 5

Figure 10:
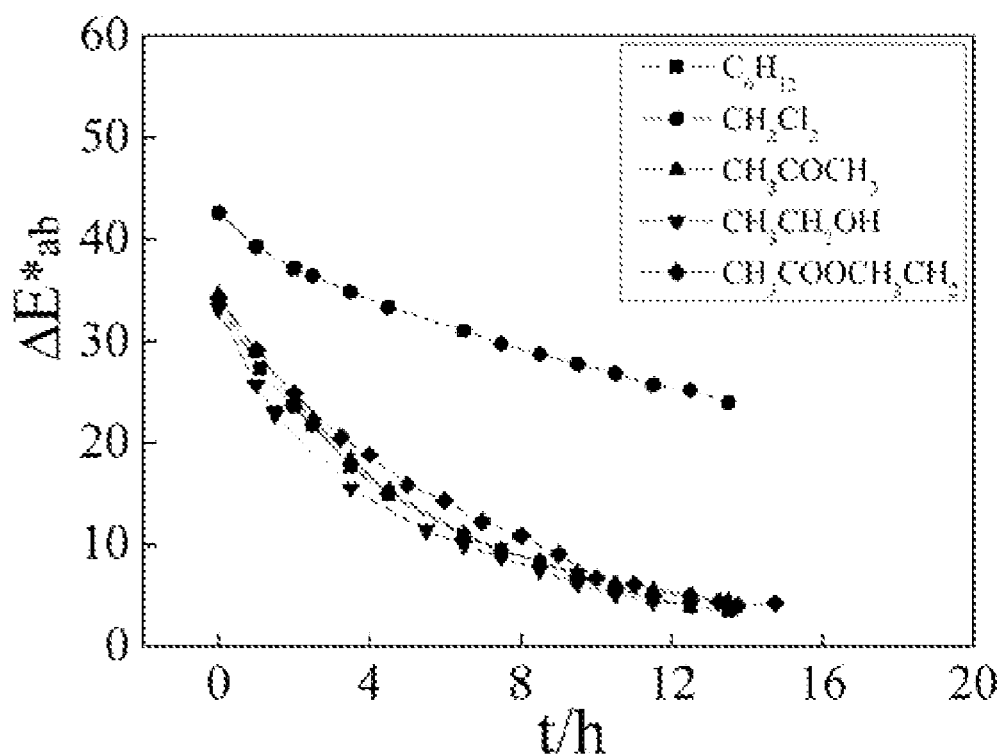
FIG. 10 shows the colour difference change of an indicator over time at the same temperature, wherein dye A is printed as the volatile dye, and cyclohexane, dichloromethane, methyl acetate, ethanol and ethyl acetate are respectively used as the solvent in example 5 of the present invention.

During the printing of the volatile dye layer, the colour change rate of the indicator and the temperature effect thereof can be adequately adjusted by using different solvents. FIG. 10 shows the colour difference change of an indicator over time at the same temperature, wherein dye A is printed as the volatile dye layer, and cyclohexane, dichloromethane, methyl acetate, ethanol and ethyl acetate are respectively used as the solvent according to the method in example 1. It is indicated in the result that when ethanol is used as the solvent, the colour change rate of the indicator is the highest; when cyclohexane and methyl acetate are used as the solvent, the colour change rate of the indicator is moderate, and lower than that of the indicator with ethanol as the solvent; when ethyl acetate is used as the solvent, the colour change rate of the indicator is lower; the colour difference increases significantly when the same amount of the volatile dye is printed with dichloromethane as the solvent, and the colour change rate of the indicator becomes much lower than that of the indicator with other solvents, which is the lowest for all solvents tested.

Example 6

Figure 11:
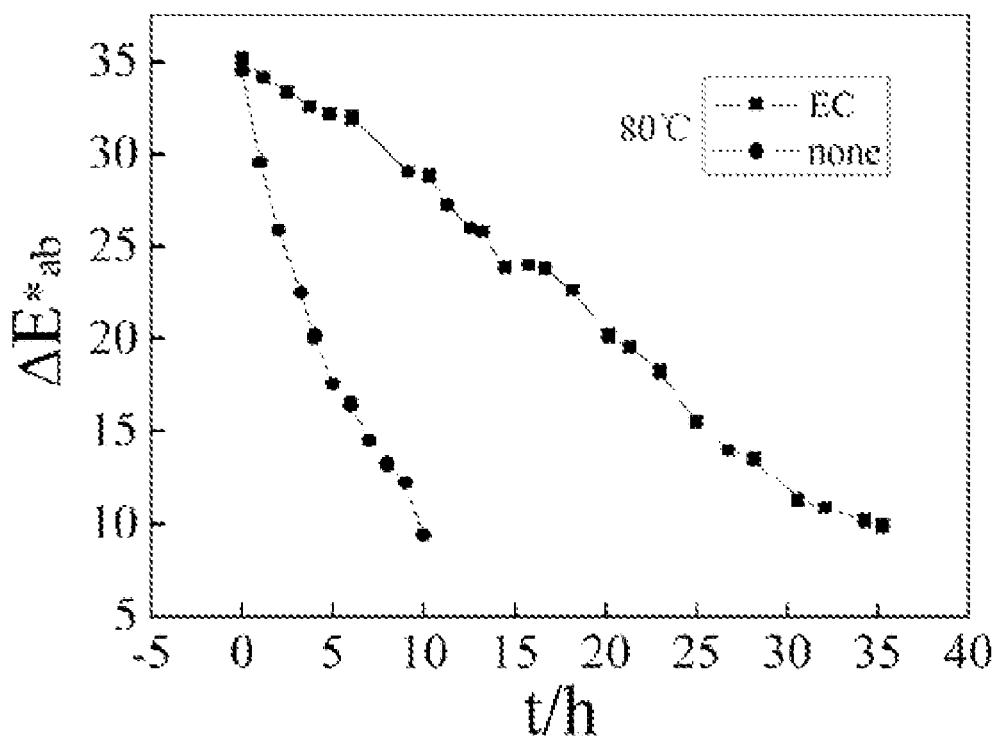
FIG. 11 shows the relation between the colour difference change of an indicator and the time at 80° C., wherein the indicator is prepared by adding adequate binder EC (ethyl cellulose) into the organic solution of dye A in example 6 of the present invention.

During the printing of the volatile dye, the colour change rate of the indicator and the temperature effect thereof can be adequately adjusted by adding suitable additives. FIG. 11 shows the relation between the colour difference change of an indicator and the time at 80° C., wherein the indicator is produced through adding adequate binder EC (i.e. ethyl cellulose) into the organic solution of dye A according to the method in example 1. It is indicated in the result that after adding the binder (the curve shown as EC in the figure), the time which the indicator spends to reach the end is 3.5 times as the time which the indicator without binder spends (the curve shown as none in the figures). The colour change time and rate of this indicator at different temperatures can be calculated with the colour difference with $\Delta E^*_{ab}=10$ as the end of the colour change, and after adding the binder the activation energy of the change process of the indicator can be further deduced as 67 kJ/mol from the Arrhenius equation, which changes a lot compared with the indicator without the binder.

Example 7

Figure 12:
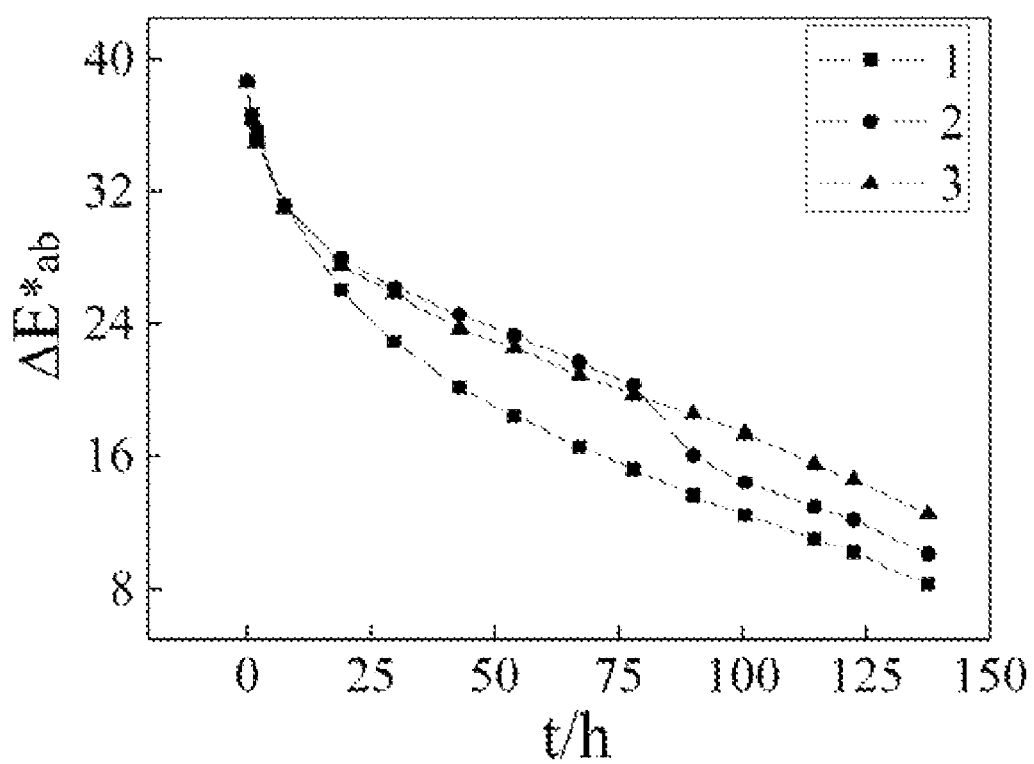
FIG. 12 shows the colour difference change in the indication function layer of a time-temperature indicator over time, wherein the time-temperature indicator is prepared with dye B as the volatile dye through selecting and using three different adsorption materials in example 7 of the present invention.

The colour change rate of the time-temperature indicator and the temperature effect thereof can be adjusted by selecting and using different adsorption materials. FIG. 12 shows that the colour difference change in the indication function layer of a time-temperature indicator over time at the same ambient temperature appears significantly different, wherein the time-temperature indicator is produced with dye B as the volatile dye through selecting and using three different adsorption materials (in the figure, materials 1, 2 and 3 are commercially available adhesive paper, commercially available adhesive coating A4 paper and commercially available oily adhesive coating A4 paper respectively) according to the method in example 1.

From the above examples, the inventor surprisingly finds that the colour change is achieved by making use of the volatilization property of the material through a volatilization-adsorption process, and it is very simply and effectively indicated whether the product monitored may deteriorate or fail due to overheat. A customized time-temperature indicator which adequately reflects the thermal stability of the product indicated can be produced by screening the volatile dyes or other volatile materials or if necessary material formulations produced to contain additives with suitable rate of volatilization and activation energy thereof. By producing a layer of adsorption function layer which can effectively adsorb the volatile dyes above the indicator and sealing the indication function layer and the adsorption function layer effectively, the contamination of the product and the package thereof by the volatilized material can be avoided while the functional position of the indicator can be prevented from the external contaminations. Further, by utilizing an adsorption layer the diffusion process of the thermally sensitive material after volatilization is artificially set as an adsorption process of the adsorption layer, so as to effectively reduce the influence of the non-temperature factors which influence the apparent volatilization rate of the thermally sensitive material during the storage and transport of the product and increase the accuracy of the product. Furthermore, the indicator is designed such that the two function portions are produced, sealed, and stored respectively, and they are combined when the indicator is pasted on the surface of the container or package of the product, so the indicator can be stored and transported at room temperature.

The above exemplary description and exemplary examples will not limit the protection scope of the present invention. Any technical solutions formed by identical alternation or equivalent substitution, or any time-temperature indicator prepared with different process or formulation according to the technical solution or concept of the present invention falls in the protection scope of the present invention.

The invention claimed is:

1. A time-temperature indicator for monitoring the quality state of a thermally sensitive article, comprising two laminated portions: an indication function layer and an adsorption function layer which are physically independent of each other before use, wherein:
   the indication function layer comprises:
      a first substrate material layer;
      a volatile dye layer, which is coated on one side of the first substrate material layer, wherein the difference between the activation energy of volatilization process of the volatile dye layer and that of quality change process of the thermally sensitive article is in a predetermined range; and
      a first release film layer, which covers the volatile dye layer, wherein the first substrate material layer and the first release film layer are larger than the volatile dye layer in dimension, and the volatile dye layer is sealed in a vapour tight seal between the first substrate material layer and the first release film layer;
   the adsorption function layer comprises:
      a second substrate material layer;
      an adsorption material layer, which is coated on one side of the second substrate material layer, wherein the adsorption material layer is larger than the volatile dye layer in dimension;

an adhesive layer, which is coated on the second substrate material layer, and surrounds the periphery of the adsorption material layer; and a second release film layer, which covers the adhesive layer and the adsorption material layer, and wherein the time-temperature indicator is configured to provide a visual indication of a time and/or temperature and the time and/or temperature is indicated by a decrease in the amount of the volatile dye located in the volatile dye layer.

2. The time-temperature indicator of claim 1, wherein the first substrate material layer has one or more transparent areas or the first substrate material layer is transparent.

3. The time-temperature indicator of claim 2, wherein, in use, the first release film layer and the second release layer are peeled off, the adsorption material layer is aligned with the volatile dye layer of the indication function layer so that the adsorption function layer covers the entire indication function layer, and the adsorption material layer and the volatile dye layer are sealed in a vapour tight seal between the first substrate material layer and the second substrate material layer; the second substrate material layer is pasted on the thermally sensitive article.

4. The time-temperature indicator of claim 1, wherein, in use, the first release film layer and the second release film layer are peeled off, the adsorption material layer is aligned with the volatile dye layer of the indication function layer so that the adsorption function layer covers the entire indication function layer, and the adsorption material layer and the volatile dye layer are sealed in a vapour tight seal between the first substrate material and the second substrate material; the first substrate material layer is pasted on the thermally sensitive article.

5. The time-temperature indicator of claim 1 further comprising a reference colour tag which is independent of the indication function layer and the adsorption function layer or is arranged adjacent to the volatile dye layer on the first substrate material layer or is prepared by the first substrate material, wherein the colour depth of the reference colour tag is the same as that of the volatile dye layer which has been subjected to a process same as the failure treatment of the thermally sensitive article.

6. The time-temperature indicator of claim 4, wherein, the substrate material layer of the indication function layer acts as a reference colour tag, the colour depth of which is the same as that of the volatile dye layer which has been subjected to a process same as the failure treatment of the thermally sensitive article.

7. The time-temperature indicator of claim 1, wherein, the thermally sensitive article is selected from vaccines, biological articles, bioactive samples, medicines, food or drinks.

8. The time-temperature indicator of claim 1, wherein, the difference between the activation energy of the volatilization process of the volatile dye and that of the quality change process of the thermally sensitive article is in a range of ±10 kJ/mol.

9. The time-temperature indicator of claim 1, wherein, the activation energy of the volatilization process of the volatile dye layer is 60-140 kJ/mol.

10. The time-temperature indicator of claim 1, wherein, the volatile dye layer is in solid state or liquid state at a temperature in the range of 0-80° C.

11. The time-temperature indicator of claim 1, wherein, the volatile dye in the volatile dye layer is at least one selected from azo dyes, anthraquinone dyes, compounds of formula I and the derivatives thereof, or the combination thereof, wherein the compounds of formula I have the following formula:

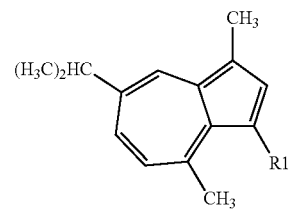

wherein,

R1 is selected from the group consisting of hydrogen, halogen, $C_{1-6}$ linear or branched alkyl, $C_{1-6}$ linear or branched alkoxy, —COR2 and —COOR2;

R2 is selected from the group consisting of hydrogen, $C_{1-6}$ linear or branched alkyl, $C_{1-6}$ linear or branched alkylamino.

12. The time-temperature indicator of claim 1, wherein, the volatile dye layer further comprises one or more volatilization additives and/or solvents, wherein the volatilization additives is one or more selected from the following volatile compounds:

linear alkanes, branched alkanes, cycloalkanes or aromatic hydrocarbons, including hexane, heptane, octane or the isomer thereof, cyclohexane, cycloheptane, cyclopentane, naphthalene, anthracene and the like;

linear or branched or aromatic or cyclic alcohols, including butantetraol, lauryl alcohol, tridecanol, tetradecanol, pentadecanol, hexadecanol, stearyl alcohol and the like;

linear or branched or aromatic or cyclic carboxylic acids, including maleic acid, fumaric acid, lauric acid, tridecanoic acid, myristic acid, pentadecanoic acid, palmitic acid, adipic acid, sebacic acid, dodecanedioic acid and the like;

amino acids, including aminobenzoic acid, leucine, phenylalanine and the like;

esters;

sulfones, including diphenyl sulfone, diphenyl disulfone, dibenzyl sulfone, dibutyl sulfone and the like;

and various volatile natural materials, including naphthalene, camphor and the like;

the solvent is one or more selected from the group consisting of water, hexane, cyclohexane, tetrahydrofuran, benzene, dimethylbenzene, methanol, ethanol, isopropyl alcohol, 2-butanol, acetone, diethyl ether, methyl acetate, ethyl acetate, carbon tetrachloride, chloroform, dichloromethane and dichloroethane.

13. The time-temperature indicator of claim 1, wherein, the adsorption material can irreversibly adsorb the dye volatilized from the volatile dye layer, and preferably the rate of the adsorption in which the adsorption material adsorbs the volatile dye is much higher than the volatilization rate of the volatile dye.

14. The time-temperature indicator of claim 1, wherein, in use, an isolation layer is further comprised between the volatile dye layer and the adsorption material layer.

15. A preparation method of a time-temperature indicator for monitoring the quality state of a thermally sensitive article, comprising the following steps:
  providing a first substrate material;
  coating a volatile dye layer on one side of the first substrate material to form a volatile dye layer, wherein the difference between the activation energy of the volatilization process of the volatile dye layer and that of the quality change process of the thermally sensitive article is in a predetermined range;
  covering the volatile dye layer in a vapour tight seal with a first release film to form an indication function layer; and
  providing a second substrate material;
  coating an adsorption material on one side of the second substrate material to form an adsorption material layer;
  wherein the adsorption material layer is larger than the volatile dye layer in dimension;
  coating an adhesive layer around the adsorption material layer on the second substrate material layer; and
  covering the adhesive layer and the adsorption material layer with a second release film, and sealing the adsorption material layer between the substrate material layer and the second release film to form an adsorption function layer, and
  wherein the time-temperature indicator is configured to provide a visual indication of a time and/or temperature and the time and/or temperature is indicated by a decrease in the amount of the volatile dye located in the volatile dye layer.

16. The method of claim 15, further comprising a step of coating a reference colour layer nearby the volatile dye layer after coating the volatile dye layer, wherein, the reference colour layer is made from non-volatile dye, and the colour depth thereof is the same as that of the volatile dye layer which has been subjected to a process same as the failure treatment of the thermally sensitive article.

17. The method of claim 15, further comprising a step of making a separate reference colour tag from a non-volatile dye.

18. The method of claim 15, wherein, the thermally sensitive article is selected from vaccines, biological articles, bioactive samples, medicines, food or drinks.

19. The method of claim 15, wherein, the volatile dye in the volatile dye layer is at least one selected from azo dyes, anthraquinone dyes, compounds of formula I and the derivatives thereof, or the combination thereof, wherein the compounds of formula I have the following formula:

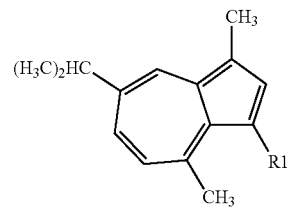

wherein,
R1 is selected from the group consisting of hydrogen, halogen, $C_{1-6}$ linear or branched alkyl, $C_{1-6}$ linear or branched alkoxy, —COR2 and —COOR2;
R2 is selected from the group consisting of hydrogen, $C_{1-6}$ linear or branched alkyl, $C_{1-6}$ linear or branched alkylamino.

20. The method of claim 15, wherein, the volatile dye layer further comprises one or more volatilization additives and/or solvents, wherein the volatilization additives is one or more selected from the following volatile compounds:
  linear alkanes, branched alkanes, cycloalkanes or aromatic hydrocarbons, including hexane, heptane, octane or the isomer thereof, cyclohexane, cycloheptane, cyclopentane, naphthalene, anthracene and the like;
  linear or branched or aromatic or cyclic alcohols, including butantetraol, lauryl alcohol, tridecanol, tetradecanol, pentadecanol, hexadecanol, stearyl alcohol and the like;
  linear or branched or aromatic or cyclic carboxylic acids, including maleic acid, fumaric acid, lauric acid, tridecanoic acid, myristic acid, pentadecanoic acid, palmitic acid, adipic acid, sebacic acid, dodecanedioic acid and the like;
  amino acids, including aminobenzoic acid, leucine, phenylalanine and the like;
  esters;
  sulfones, including diphenyl sulfone, diphenyl disulfone, dibenzyl sulfone, dibutyl sulfone and the like;
  and various volatile natural materials, including naphthalene, camphor and the like;
  the solvent is one or more selected from the group consisting of water, hexane, cyclohexane, tetrahydrofuran, benzene, dimethylbenzene, methanol, ethanol, isopropyl alcohol, 2-butanol, acetone, diethyl ether, methyl acetate, ethyl acetate, carbon tetrachloride, chloroform, dichloromethane and dichloroethane.

* * * * *

UNITED STATES PATENT AND TRADEMARK OFFICE
CERTIFICATE OF CORRECTION

PATENT NO. : 9,618,398 B2  
APPLICATION NO. : 14/127410  
DATED : April 11, 2017  
INVENTOR(S) : Zongwu Deng, Xiaofang Ying and Xiaoju Shi Page 1 of 1

It is certified that error appears in the above-identified patent and that said Letters Patent is hereby corrected as shown below:

On the Title Page

Item (30), Foreign Application Priority Data:
Delete "2011 1 0178976" and replace with --201110178976.4--.

In the Claims

Claim 3, Column 37, Line 15:
Delete "second release layer" and replace with --second release film layer--.

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*